US011357013B2

United States Patent
Zhou et al.

(10) Patent No.: US 11,357,013 B2
(45) Date of Patent: Jun. 7, 2022

(54) CONDITIONAL NEGATIVE ACKNOWLEDGEMENT TRANSMISSION IN MULTI-COMPONENT CARRIER COMMUNICATION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Seyed Ali Akbar Fakoorian, San Diego, CA (US); Mostafa Khoshnevisan, San Diego, CA (US); Rajat Prakash, San Diego, CA (US); Vinay Joseph, Calicut (IN); Sony Akkarakaran, Poway, CA (US); Juan Montojo, San Diego, CA (US); Hamed Pezeshki, San Diego, CA (US); Konstantinos Dimou, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/899,001

(22) Filed: Jun. 11, 2020

(65) Prior Publication Data
US 2021/0029705 A1 Jan. 28, 2021

Related U.S. Application Data

(60) Provisional application No. 62/877,749, filed on Jul. 23, 2019.

(51) Int. Cl.
*H04W 72/04* (2009.01)
*H04L 5/00* (2006.01)
(Continued)

(52) U.S. Cl.
CPC ......... *H04W 72/0493* (2013.01); *H04L 1/189* (2013.01); *H04L 5/0051* (2013.01);
(Continued)

(58) Field of Classification Search
None
See application file for complete search history.

(56) References Cited

U.S. PATENT DOCUMENTS

2014/0269301 A1* 9/2014 Rungta ................. H04L 47/115
370/235
2018/0049073 A1* 2/2018 Dinan ............... H04W 72/0413
(Continued)

FOREIGN PATENT DOCUMENTS

| WO | WO-2017196086 A1 | 11/2017 |
| WO | WO-2018144559 A1 | 8/2018 |
| WO | WO-2018172136 A1 | 9/2018 |

OTHER PUBLICATIONS

International Search Report and Written Opinion—PCT/US2020/037431—ISA/EPO—dated Sep. 25, 2020.

*Primary Examiner* — Anh Ngoc M Nguyen
(74) *Attorney, Agent, or Firm* — Holland & Hart LLP

(57) ABSTRACT

Methods, systems, and devices for wireless communications are described. A user equipment (UE) may receive control signaling configuring the UE with a set of frequency resources and a semi-persistent resource allocation indicating a semi-persistent resource occasion on each frequency resource of the set. The UE may monitor semi-persistent resource occasions on each of the set of frequency resources for a copy of a data transmission. If the UE receives and decodes the data transmission from at least one of the semi-persistent resource occasions, the UE may transmit an acknowledgement message on a frequency resource of the set. Additionally, the UE may refrain from transmitting a feedback message on the other frequency resources of the (Continued)

set. If the UE does not receive and successfully decode the data transmission from any of the semi-persistent resource occasions, the UE may transmit a negative acknowledgement message on one of the set of frequency resources.

30 Claims, 17 Drawing Sheets

(51) Int. Cl.
*H04W 24/08* (2009.01)
*H04L 1/18* (2006.01)
*H04W 76/28* (2018.01)
*H04W 72/14* (2009.01)
*H04L 25/02* (2006.01)

(52) U.S. Cl.
CPC ........ *H04L 5/0055* (2013.01); *H04L 25/0226* (2013.01); *H04W 24/08* (2013.01); *H04W 72/042* (2013.01); *H04W 72/0453* (2013.01); *H04W 72/14* (2013.01); *H04W 76/28* (2018.02)

(56) References Cited

U.S. PATENT DOCUMENTS

| | | | |
|---|---|---|---|
| 2019/0199503 A1* | 6/2019 | Son | H04L 5/0053 |
| 2019/0305913 A1* | 10/2019 | Schierl | H04L 5/0044 |
| 2020/0059821 A1* | 2/2020 | Wirth | H04L 1/1851 |
| 2020/0154467 A1* | 5/2020 | Gong | H04W 24/08 |

* cited by examiner

CONDITIONAL NEGATIVE ACKNOWLEDGEMENT TRANSMISSION IN MULTI-COMPONENT CARRIER COMMUNICATION

CROSS REFERENCE

The present Application for Patent claims the benefit of U.S. Provisional Patent Application No. 62/877,749 by Zhou et al., entitled "CONDITIONAL NEGATIVE ACKNOWLEDGEMENT TRANSMISSION IN MULTI-COMPONENT CARRIER COMMUNICATION," filed Jul. 23, 2019, assigned to the assignee hereof, and expressly incorporated by reference herein.

BACKGROUND

The following relates generally to wireless communications, and more specifically to conditional negative acknowledgement transmission in multi-component carrier (CC) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may be scheduled with semi-persistently scheduled (SPS) resource occasions over which the UE may monitor for one or more transmissions (e.g., downlink transmissions or sidelink transmissions). If the UE receives and successfully decodes a transmission, the UE may transmit an acknowledgement (ACK). If the UE fails to receive or to decode a transmission, the UE may transmit a negative acknowledgement (NACK), and the base station may transmit a retransmission. However, some aspects of semi-persistent transmission techniques may be deficient.

SUMMARY

The described techniques relate to improved methods, systems, devices, and apparatuses that support conditional negative acknowledgement transmission in multi-CC communication. Generally, the described techniques provide for a UE to monitor semi-persistent resource occasions on each frequency resource of a set of frequency resources, such as a set of CCs, for a copy of a data transmission. If the UE receives and decodes the data transmission from at least one of the semi-persistent resource occasions, the UE may transmit an acknowledgement message on one frequency resource of the set of frequency resources, such as on a particular CC. Additionally, the UE may refrain from transmitting one or more feedback messages on the other frequency resources of the set. If the UE does not receive or successfully decode the data transmission from any of the semi-persistent resource occasions, the UE may transmit a negative acknowledgement message on one frequency resource of the set of frequency resources.

A method for wireless communications by a UE is described. The method may include receiving control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, monitoring the semi-persistent resource occasion on each of the set of frequency resources for a copy of the data transmission, and transmitting an acknowledgement message via a first frequency resource of the set of frequency resources based on at least one copy of the data transmission being decoded from the semi-persistent resource occasion on at least one frequency resource of the set of frequency resources.

An apparatus for wireless communications by a UE is described. The apparatus may include a processor, memory in communication with the processor, and instructions stored in the memory. The instructions may be executable by the processor to cause the apparatus to receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, monitor the semi-persistent resource occasion on each of the set of frequency resources for a copy of the data transmission, and transmit an acknowledgement message via a first frequency resource of the set of frequency resources based on at least one copy of the data transmission being decoded from the semi-persistent resource occasion on at least one frequency resource of the set of frequency resources.

Another apparatus for wireless communications by a UE is described. The apparatus may include means for receiving control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, means for monitoring the semi-persistent resource occasion on each of the set of frequency resources for a copy of the data transmission, and means for transmitting an acknowledgement message via a first frequency resource of the set of frequency resources based on at least one copy of the data transmission being decoded from the semi-persistent resource occasion on at least one frequency resource of the set of frequency resources.

A non-transitory computer-readable medium storing code for wireless communications by a UE is described. The code may include instructions executable by a processor to receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, monitor the semi-persistent resource occasion on each of the set of frequency resources for a copy of the data transmission, and transmit an acknowledgement message via a first frequency resource of the set of frequency resources based on at least one copy of the data transmission being decoded from the semi-persistent resource occasion on at least one frequency resource of the set of frequency resources.

In some examples of the method, apparatuses, and non-transitory computer-readable medium described herein, receiving the control signaling may include operations, features, means, or instructions for receiving control signaling configuring a feedback scheme at the UE, where transmitting the acknowledgement message via the first frequency resource is based on the control signaling configuring the feedback scheme.

In some examples of the method, apparatuses, and non-transitory computer-readable medium described herein, receiving the semi-persistent resource allocation may include operations, features, means, or instructions for receiving the semi-persistent resource allocation that indicates the semi-persistent resource occasion may be configured on each of the set of frequency resources for a defined number of time intervals.

Some examples of the method, apparatuses, and non-transitory computer-readable medium described herein may further include operations, features, means, or instructions for determining to skip transmission of a feedback message via a second frequency resource of the set of frequency resources based on transmitting the acknowledgement message via the first frequency resource.

Some examples of the method, apparatuses, and non-transitory computer-readable medium described herein may further include operations, features, means, or instructions for receiving the copy of the data transmission via the first frequency resource, one or more other frequency resources of the set of frequency resources, or both.

Some examples of the method, apparatuses, and non-transitory computer-readable medium described herein may further include operations, features, means, or instructions for applying a discontinuous transmission via the second frequency resource during an occasion for transmitting the feedback message.

Some examples of the method, apparatuses, and non-transitory computer-readable medium described herein may further include operations, features, means, or instructions for receiving an indication of a set of semi-persistent identifiers (ID) configured for duplicate data transmission on the set of frequency resources.

In some examples of the method, apparatuses, and non-transitory computer-readable medium described herein, the wireless device may be a second UE or a base station.

In some examples of the method, apparatuses, and non-transitory computer-readable medium described herein, each of the set of frequency resources includes a CC.

A method for wireless communications by a UE is described. The method may include receiving control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, monitoring the semi-persistent resource occasion on each of the set of frequency resources for a copy of the data transmission, and transmitting a negative acknowledgement message via a first frequency resource of the set of frequency resources based on failing to decode the data transmission from the semi-persistent resource occasion on any of the set of frequency resources.

An apparatus for wireless communications by a UE is described. The apparatus may include a processor, memory in communication with the processor, and instructions stored in the memory. The instructions may be executable by the processor to cause the apparatus to receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, monitor the semi-persistent resource occasion on each of the set of frequency resources for a copy of the data transmission, and transmit a negative acknowledgement message via a first frequency resource of the set of frequency resources based on failing to decode the data transmission from the semi-persistent resource occasion on any of the set of frequency resources.

Another apparatus for wireless communications by a UE is described. The apparatus may include means for receiving control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, means for monitoring the semi-persistent resource occasion on each of the set of frequency resources for a copy of the data transmission, and means for transmitting a negative acknowledgement message via a first frequency resource of the set of frequency resources based on failing to decode the data transmission from the semi-persistent resource occasion on any of the set of frequency resources.

A non-transitory computer-readable medium storing code for wireless communications by a UE is described. The code may include instructions executable by a processor to receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, monitor the semi-persistent resource occasion on each of the set of frequency resources for a copy of the data transmission, and transmit a negative acknowledgement message via a first frequency resource of the set of frequency resources based on failing to decode the data transmission from the semi-persistent resource occasion on any of the set of frequency resources.

In some examples of the method, apparatuses, and non-transitory computer-readable medium described herein, receiving the control signaling may include operations, features, means, or instructions for receiving control signaling configuring a feedback scheme at the UE, where transmitting the negative acknowledgement message via the first frequency resource is based on the control signaling configuring the feedback scheme.

Some examples of the method, apparatuses, and non-transitory computer-readable medium described herein may further include operations, features, means, or instructions for transmitting a reference signal via a set of beams using the first frequency resource.

In some examples of the method, apparatuses, and non-transitory computer-readable medium described herein, the reference signal may be a sounding reference signal.

Some examples of the method, apparatuses, and non-transitory computer-readable medium described herein may further include operations, features, means, or instructions for identifying a configuration for the sounding reference signal and associated with the first frequency resource, where transmitting the sounding reference signal is based on the identified configuration Some examples of the method, apparatuses, and non-transitory computer-readable medium described herein may further include operations, features, means, or instructions for receiving downlink control information indicating a configuration for the sounding reference signal and associated with the first frequency resource, where transmitting the sounding reference signal is based on the indicated configuration.

In some examples of the method, apparatuses, and non-transitory computer-readable medium described herein, the first frequency resource may be within a millimeter wave frequency band.

Some examples of the method, apparatuses, and non-transitory computer-readable medium described herein may further include operations, features, means, or instructions for receiving, via a control channel of the first frequency resource, a grant scheduling a retransmission of the data transmission, and monitoring a data channel of the first frequency resource for the retransmission of the data transmission based on the grant.

In some examples of the method, apparatuses, and non-transitory computer-readable medium described herein, receiving the semi-persistent resource allocation may include operations, features, means, or instructions for receiving the semi-persistent resource allocation that indicates the semi-persistent resource occasion may be configured on each of the set of frequency resources for a defined number of time intervals.

Some examples of the method, apparatuses, and non-transitory computer-readable medium described herein may further include operations, features, means, or instructions for receiving an indication of a set of semi-persistent IDs configured for duplicate data transmission on the set of frequency resources.

In some examples of the method, apparatuses, and non-transitory computer-readable medium described herein, the wireless device may be a second UE or a base station.

In some examples of the method, apparatuses, and non-transitory computer-readable medium described herein, each of the set of frequency resources includes a CC.

A method for wireless communications by a wireless device is described. The method may include transmitting control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, transmitting, via the semi-persistent resource occasion, a copy of the data transmission on one or more frequency resources of the set of frequency resources, and receiving an acknowledgement message via a first frequency resource of the set of frequency resources based on at least one copy of the data transmission being decoded by the UE from the semi-persistent resource occasion on at least one frequency resource of the set of frequency resources.

An apparatus for wireless communications by a wireless device is described. The apparatus may include a processor, memory in communication with the processor, and instructions stored in the memory. The instructions may be executable by the processor to cause the apparatus to transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, transmit, via the semi-persistent resource occasion, a copy of the data transmission on one or more frequency resources of the set of frequency resources, and receive an acknowledgement message via a first frequency resource of the set of frequency resources based on at least one copy of the data transmission being decoded by the UE from the semi-persistent resource occasion on at least one frequency resource of the set of frequency resources.

Another apparatus for wireless communications by a wireless device is described. The apparatus may include means for transmitting control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, means for transmitting, via the semi-persistent resource occasion, a copy of the data transmission on one or more frequency resources of the set of frequency resources, and means for receiving an acknowledgement message via a first frequency resource of the set of frequency resources based on at least one copy of the data transmission being decoded by the UE from the semi-persistent resource occasion on at least one frequency resource of the set of frequency resources.

A non-transitory computer-readable medium storing code for wireless communications by a wireless device is described. The code may include instructions executable by a processor to transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, transmit, via the semi-persistent resource occasion, a copy of the data transmission on one or more frequency resources of the set of frequency resources, and receive an acknowledgement message via a first frequency resource of the set of frequency resources based on at least one copy of the data transmission being decoded by the UE from the semi-persistent resource occasion on at least one frequency resource of the set of frequency resources.

In some examples of the method, apparatuses, and non-transitory computer-readable medium described herein, transmitting the control signaling may include operations, features, means, or instructions for transmitting control signaling configuring a feedback scheme at the UE, where receiving the acknowledgement message via the first frequency resource is based on the control signal configuring the feedback scheme.

In some examples of the method, apparatuses, and non-transitory computer-readable medium described herein, transmitting the semi-persistent resource allocation may include operations, features, means, or instructions for transmitting the semi-persistent resource allocation that indicates the semi-persistent resource occasion may be configured on each of the set of frequency resources for a defined number of time intervals.

Some examples of the method, apparatuses, and non-transitory computer-readable medium described herein may further include operations, features, means, or instructions for transmitting an indication of a set of semi-persistent IDs configured for duplicate data transmission on the set of frequency resources.

In some examples of the method, apparatuses, and non-transitory computer-readable medium described herein, the wireless device may be a second UE or a base station.

In some examples of the method, apparatuses, and non-transitory computer-readable medium described herein, each of the set of frequency resources includes a CC.

A method for wireless communications by a wireless device is described. The method may include transmitting control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, transmitting, via the semi-persistent resource occasion, a copy of the data transmission on one or more frequency resources of the set of frequency resources, and receiving a negative acknowledgement message via a first frequency resource of the set of frequency resources based on the UE failing to decode the data transmission from the semi-persistent resource occasion on any of the set of frequency resources.

An apparatus for wireless communications by a wireless device is described. The apparatus may include a processor, memory in communication with the processor, and instructions stored in the memory. The instructions may be executable by the processor to cause the apparatus to transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, transmit, via the semi-persistent resource occasion, a copy of the data transmission on one or more frequency resources of the set of frequency resources, and receive a negative acknowledgement message via a first frequency resource of the set of frequency resources based on the UE failing to decode the data transmission from the semi-persistent resource occasion on any of the set of frequency resources.

Another apparatus for wireless communications by a wireless device is described. The apparatus may include means for transmitting control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, means for transmitting, via the semi-persistent resource occasion, a copy of the data transmission on one or more frequency resources of the set of frequency resources, and means for receiving a negative acknowledgement message via a first frequency resource of the set of frequency resources based on the UE failing to decode the data transmission from the semi-persistent resource occasion on any of the set of frequency resources.

A non-transitory computer-readable medium storing code for wireless communications by a wireless device is described. The code may include instructions executable by a processor to transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, transmit, via the semi-persistent resource occasion, a copy of the data transmission on one or more frequency resources of the set of frequency resources, and receive a negative acknowledgement message via a first frequency resource of the set of frequency resources based on the UE failing to decode the data transmission from the semi-persistent resource occasion on any of the set of frequency resources.

In some examples of the method, apparatuses, and non-transitory computer-readable medium described herein, transmitting the control signaling may include operations, features, means, or instructions for transmitting control signaling configuring a feedback scheme at the UE, where receiving the negative acknowledgement message via the first frequency resource is based on the control signaling configuring the feedback scheme.

Some examples of the method, apparatuses, and non-transitory computer-readable medium described herein may further include operations, features, means, or instructions for receiving a reference signal via a set of beams using the first frequency resource, and selecting a second frequency resource of the set of frequency resources for transmission of a second data transmission based on measurements of the reference signal received via the set of beams.

In some examples of the method, apparatuses, and non-transitory computer-readable medium described herein, the reference signal may be a sounding reference signal.

Some examples of the method, apparatuses, and non-transitory computer-readable medium described herein may further include operations, features, means, or instructions for identifying a configuration for the sounding reference signal and associated with the first frequency resource, where receiving the sounding reference signal is based on the identified configuration.

Some examples of the method, apparatuses, and non-transitory computer-readable medium described herein may further include operations, features, means, or instructions for transmitting downlink control information indicating a configuration for the sounding reference signal and associated with the first frequency resource, where receiving the sounding reference signal is based on the indicated configuration In some examples of the method, apparatuses, and non-transitory computer-readable medium described herein, the first frequency resource may be within a millimeter wave frequency band.

Some examples of the method, apparatuses, and non-transitory computer-readable medium described herein may further include operations, features, means, or instructions for transmitting, via a control channel of the first frequency resource, a grant scheduling a retransmission of the data transmission, and transmitting the retransmission of the data transmission based on the grant.

In some examples of the method, apparatuses, and non-transitory computer-readable medium described herein, transmitting the semi-persistent resource allocation may include operations, features, means, or instructions for transmitting the semi-persistent resource allocation that indicates the semi-persistent resource occasion may be configured on each of the set of frequency resources for a defined number of time intervals.

Some examples of the method, apparatuses, and non-transitory computer-readable medium described herein may further include operations, features, means, or instructions for transmitting an indication of a set of semi-persistent IDs configured for duplicate data transmission on the set of frequency resources.

In some examples of the method, apparatuses, and non-transitory computer-readable medium described herein, the wireless device may be a second UE or a base station.

In some examples of the method, apparatuses, and non-transitory computer-readable medium described herein, each of the set of frequency resources includes a CC.

DETAILED DESCRIPTION

In some cases, a UE may be configured by a wireless device (e.g., a base station or another UE) with SPS resource occasions over multiple CCs. The SPS resource occasions may overlap at least partially in time and may recur on a periodic basis. If the UE fails to receive and decode a transmission on a given SPS occasion, the UE may transmit a NACK to the wireless device on that CC. Meanwhile, if the UE successfully receives and decodes a transmission on a given SPS occasion, the UE may transmit an ACK to the wireless on that CC. Each time the UE transmits a NACK or an ACK over a CC, that NACK or ACK may introduce uplink interference with other transmissions in that CC.

In some cases, the UE may be configured to receive duplicate messages (e.g., a duplicate transport block (TB) or packet data convergence protocol (PDCP) protocol data unit (PDU) message) over the overlapping SPS resource occasions. If the UE receives and successfully decodes one of the duplicate messages, the UE may have received the same data as if the UE successfully decoded any of the other duplicate messages. In such cases, receiving a single ACK from the UE may sufficiently enable the wireless device which sent the duplicate messages to determine that the UE successfully decoded the message.

If the UE is configured to receive duplicate messages, the UE may mitigate interference from NACK or ACK transmissions by transmitting an ACK for the CC over which the successfully decoded duplicate message was received and refraining from transmitting NACKs for the CCs on which the UE did not successfully decode a duplicate message. Additionally, if the UE successfully decodes multiple duplicate messages from multiple CCs, the UE may transmit a single ACK for the successful decoding. The single ACK may be transmitted over one of the CCs over which the UE successfully received and decoded the message. By transmitting a single ACK over one CC and refraining from transmitting ACKs or NACKs for other CCs, the UE may reduce interference associated with those other ACKs or NACKs from being introduced.

Aspects of the disclosure are initially described in the context of a wireless communications system. Additional aspects of the disclosure are further described in the context of an additional wireless communications scheme, multi-CC SPS packet duplication schemes, and a process flow. Aspects of the disclosure are further illustrated by and described with reference to apparatus diagrams, system diagrams, and flowcharts that relate to conditional negative acknowledgement transmission in multi-CC communication.

Figure 1:
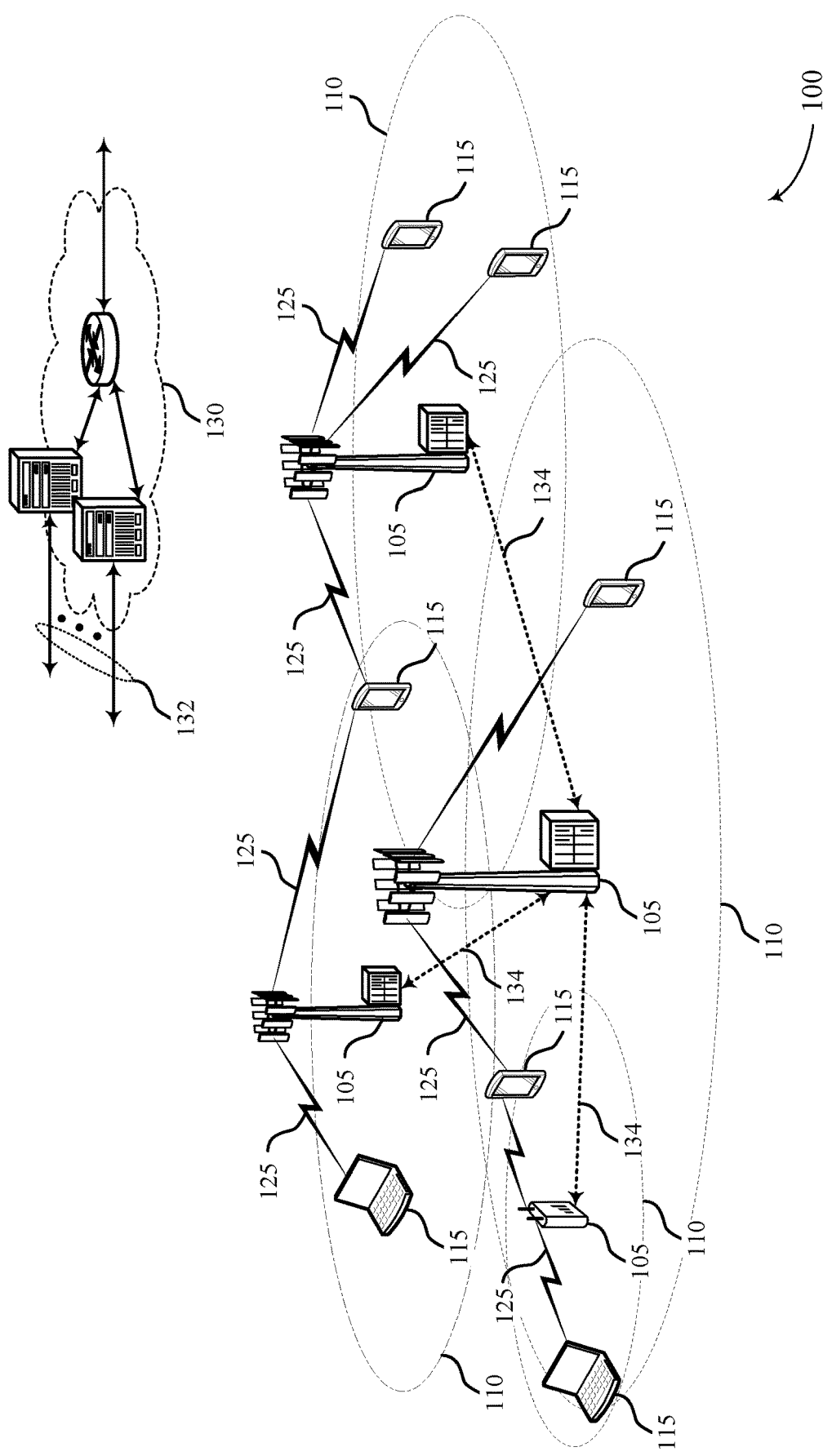
FIG. 1 illustrates an example of a wireless communications system that supports conditional negative acknowledgement transmission in multi-CC communication in accordance with aspects of the present disclosure.

FIG. 1 illustrates an example of a wireless communications system 100 that supports conditional negative acknowledgement transmission in multi-CC communication in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an ID for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing (SCS) or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, as described herein, a UE 115 may monitor SPS resource occasions on each of a set of frequency resources (e.g., a set of CCs) for a copy of a data transmission. If the UE 115 receives and decodes the data transmission from at least one of the semi-persistent resource occasions, the UE 115 may transmit an acknowledgement message (e.g., an ACK) on one of the set of frequency resources. Additionally, the UE 115 may refrain from transmitting one or more feedback messages on the other frequency resources of the set. If the UE 115 does not receive or successfully decode the data transmission from any of the semi-persistent resource occasions, the UE 115 may transmit a negative acknowledgement message (e.g., a NACK) on one of the set of frequency resources.

Figure 2:
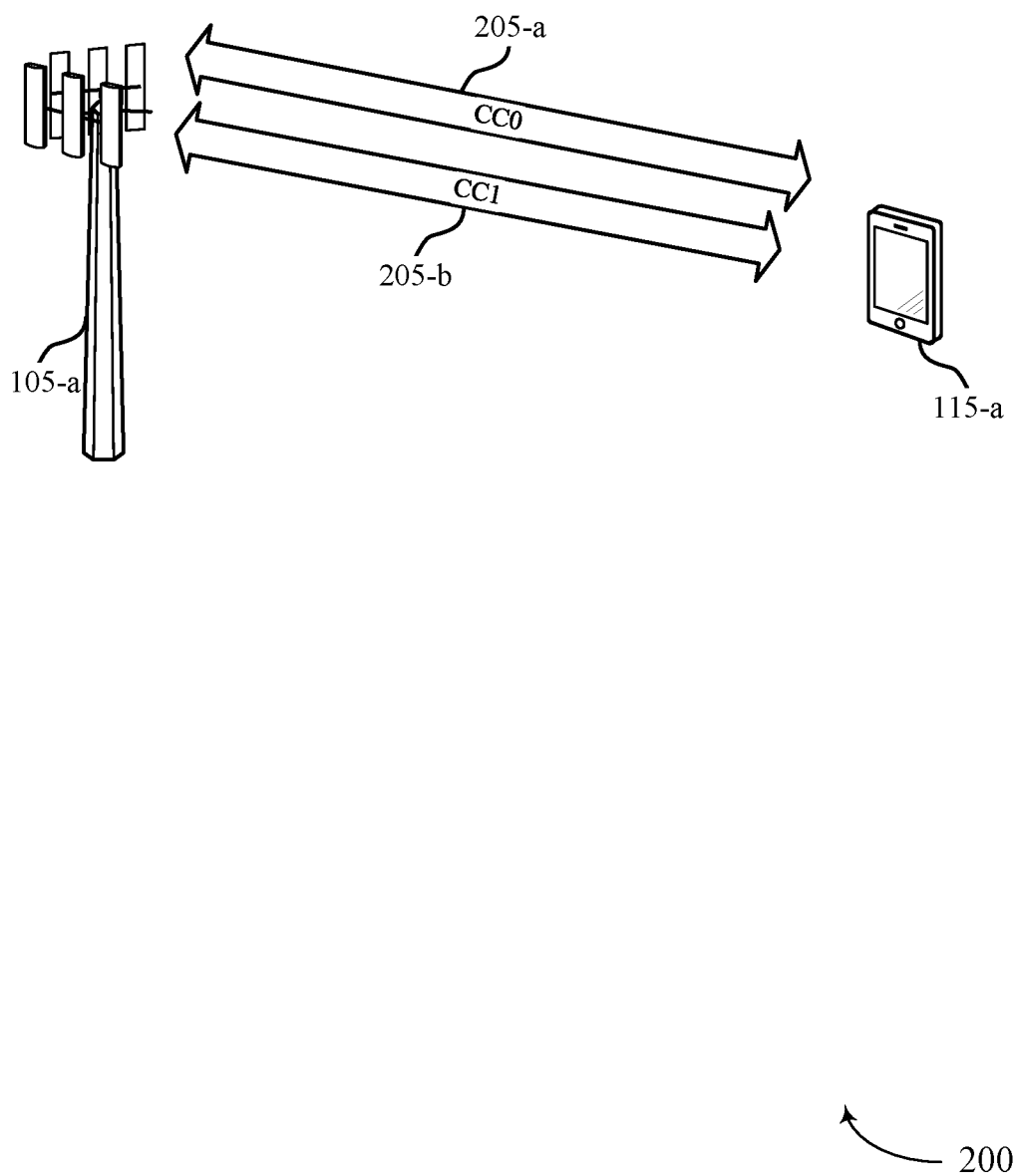
FIG. 2 illustrates an example of a wireless communications system that supports conditional negative acknowledgement transmission in multi-CC communication in accordance with aspects of the present disclosure.

FIG. 2 illustrates an example of a wireless communications system 200 that supports conditional negative acknowledgement transmission in multi-CC communication in accordance with aspects of the present disclosure. In some examples, wireless communications system 200 may implement aspects of wireless communications system 100. For instance, UE 115-a and base station 105-a may be examples of a UE 115 and a base station 105, as described with reference to FIG. 1. In some cases, base station 105-a may be replaced with a UE 115 without deviating from the scope of the present disclosure.

Broadly, wireless communications system 200 may include base station 105-a and UE 115-a communicating (e.g., uplink and/or downlink data transmissions) using a plurality of CCs 205, e.g., CC0 205-a and CC1 205-b. Although two CCs 205 are shown in wireless communications system 200, in some cases, base station 105-a and UE 115-a may communicate using more than two CCs 205. In some aspects, each CC 205 within the plurality of CCs 205 may be associated with the same frequency range (e.g., frequency range (FR) one (FR1), FR two (FR2)) or may be associated with different frequency ranges. For example, the first CC 205 (e.g., CC0 205-a)) may be associated with FR1 (e.g., sub-6 GHz) and the second CC 205 (e.g., CC1 205-b) may be associated with FR2 (e.g., over 6-GHz), or vice versa. A third, fourth, etc., CC 205 may also be associated with the same or with different frequency ranges.

In some aspects, each CC 205 may be associated with a corresponding time interval (e.g., subframe), which may then be divided into smaller time intervals (e.g., slots), which may be the same or may be different between the CCs 205 of the plurality of CCs 205. For example, a first CC 205 (e.g., CC0 205-a) may be associated with a first slot having a first duration and the second CC 205 (e.g., CC1 205-b) may be associated with a second slot, which may have the same duration as or a different duration than the first slot. In some aspects, the duration of the slots for each time interval associated with each CC 205 may be dependent upon the frequency range for that CC 205. For example, the first CC 205 (e.g., CC0 205-a) may be associated with FR1 having an SCS of 60 kHz and the second CC 205 (e.g., CC1 205-b) may be associated with FR2 having an SCS of 120 kHz. Accordingly, the duration of the slots in the time interval for CC0 205-a on FR1 having a 60 kHz SCS may be different than the duration of the slots in the time interval for CC1 205-b on FR2 having a 120 kHz SCS.

Base station 105-a may monitor, manage, control, or otherwise configure communications with UE 115-a on the plurality of CCs 205. In some examples, this may include a semi-persistent resource allocation of a resource that spans a plurality of time intervals. Broadly, a semi-persistent resource allocation of resources may include base station 105-a configuring UE 115-a with time, frequency, code, spatial, etc., resources that span the plurality of time intervals. This may be different from other resources which are dynamically allocated within a time interval. Base station 105-a may allocate or otherwise configure the semi-persistent resources for UE 115-a to use for uplink communications and/or downlink communications using the plurality of CCs 205. For uplink communications, such semi-persistent resources may be a configured grant for uplink transmissions, autonomous uplink (AUL) transmission resources, and the like. For downlink communications, such semi-persistent resources may be a configured grant for downlink transmission (e.g., physical downlink shared channel (PDSCH)), SPS transmission resources, and the like. If a UE 115 is substituted for base station 105a, such semi-persistent resources may be a configured grant for sidelink transmission (e.g., physical sidelink shared channel (PSSCH)). In some examples, base station 105-a may configure the SPS transmission resources as part of configuring the feedback scheme described herein.

If UE 115-a receives and decodes a transmission on an SPS resource occasion in a given CC 205, UE 115-a may transmit an ACK to base station 105-a over that given CC. Alternatively, if UE 115-a does not receive a transmission on an SPS resource occasion in the given CC 205 or fails to decode the transmission, UE 115-a may transmit a NACK to base station 105-a.

Base station 105-a and UE 115-a may exchange a variety of signals to configure UE 115-a with the plurality of CCs 205 and the semi-persistent allocation of resources for communications. For example, base station 105 may transmit control signaling (e.g., RRC signaling, MAC control element (MAC-CE) signaling, downlink control information (DCI), and the like) to UE 115-a to activate, identify, or otherwise configure UE 115-a with the plurality of CCs 205 and/or the allocation of semi-persistent resources in or otherwise spanning a plurality of corresponding time intervals for communicating with base station 105.

In some cases, the SPS resource occasions on multiple CCs 205 may overlap at least partially in time. For instance, an SPS resource occasion on CC0 205-a may span a time that overlaps at least partially with an SPS resource occasion on CC1 205-b. In such cases, base station 105-a may be configured to transmit and UE 115-a may be configured to receive a PDSCH for the SPS resource occasion on CC0 205-a simultaneously with transmitting or receiving a PDSCH for the SPS resource occasion on CC1 205-b.

In some cases, base station 105-a may transmit multiple copies of a PDSCH transmission over SPS resource occasions on different CCs 205 that overlap in time. In some examples, transmitting multiple copies of the PDSCH may enable UE 115-a to have more opportunities to decode the PDSCH transmission, which may limit a number of retransmissions performed by base station 105-a and may increase robustness.

As described herein, UE 115-a may transmit ACKs over CCs 205 on which a PDSCH was received and successfully decoded and may transmit NACKs otherwise. However, assuming each of the PDSCH transmissions are copies of each other, UE 115-a may receive the same data by decoding one copy of the PDSCH transmission as from decoding another copy. As such, transmitting multiple ACKs for decoding multiple copies of the PDSCH transmission may provide redundant feedback to base station 105-a. Additionally, transmitting multiple ACKs may introduce uplink interference into the respective CCs 205 over which the ACKs are transmitted, as other wireless devices may be communicating over the resources over which the ACKs are sent.

Additionally, assuming that each PDSCH transmission that base station 105-a directs to UE 115-a over the overlapping SPS resources are copies of each other and that UE 115-a transmits an ACK upon successful decoding of at least one of the copies, base station 105-a may determine, by receiving the ACK alone, that UE 115-a received and decoded a sum total of data directed to UE 115-a for the overlapping SPS resource occasions. As such, even if UE 115-a does not transmit NACKs for CCs 205 over which UE 115-a did not receive a PDSCH transmission during the overlapping SPS resource occasions, base station 105-a may still be capable of determining, by the ACK alone, that no retransmissions are to be performed. Additionally, transmitting NACKs may introduce uplink interference into the respective CCs 205 over which the NACKs are transmitted, as other wireless devices may be communicating over the resources over which the NACKs are sent.

To mitigate the interference generated by NACKs and ACKs, UE 115-a may transmit a single ACK over a single CC 205 if any of the multiple copies of the PDSCH transmission are decoded and may forego transmitting additional ACKs or NACKs over other CCs 205. As described herein, base station 105-a may determine that UE 115-a successfully received and decoded at least one of the multiple copies of the PDSCH by receiving a single ACK and may do so without receiving additional ACKs or NACKs.

Figure 3:
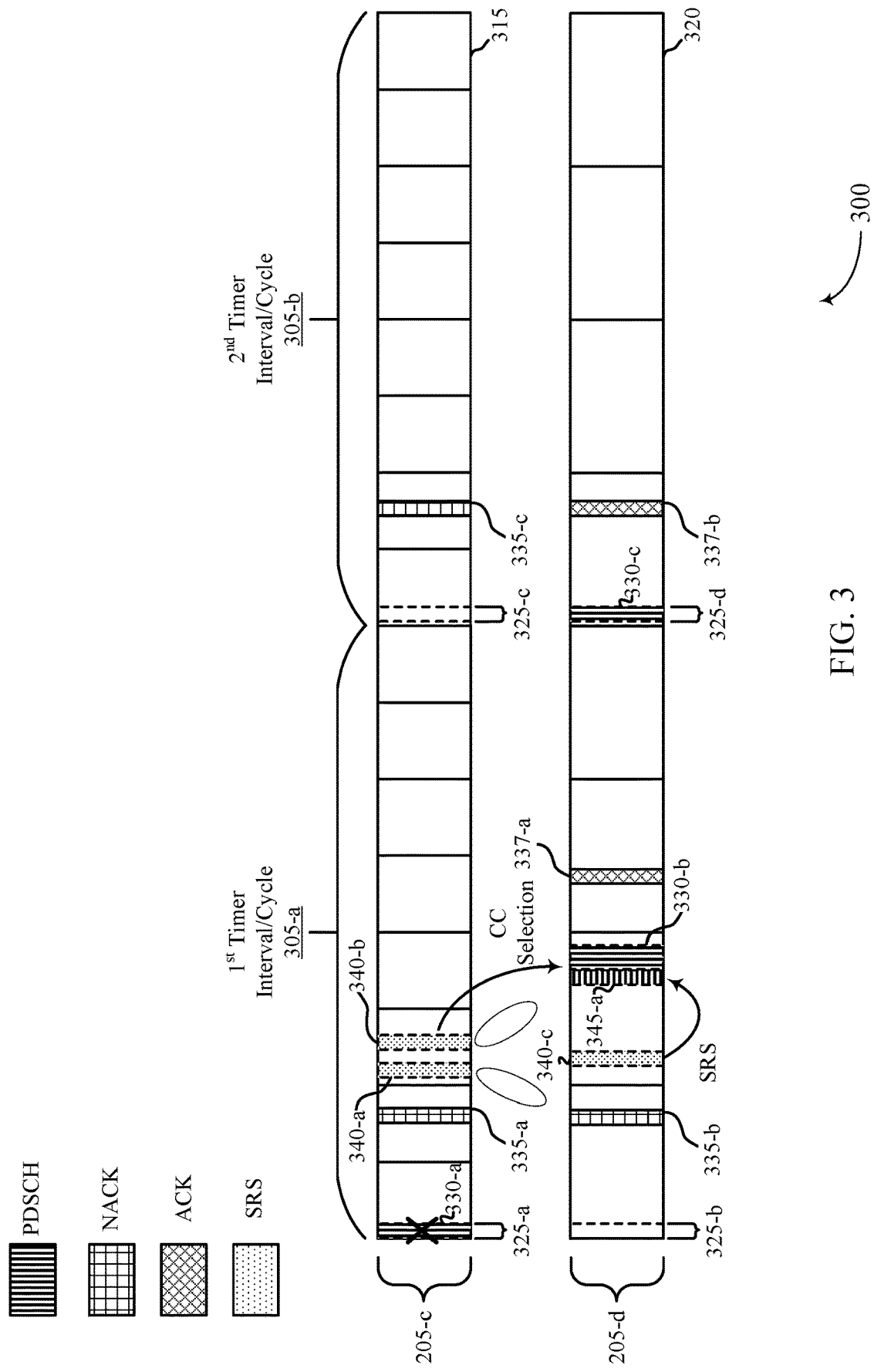
FIG. 3 illustrates an example of a multi-CC SPS packet duplication scheme that supports conditional negative acknowledgement transmission in multi-CC communication in accordance with aspects of the present disclosure.

FIG. 3 illustrates an example of a multi-CC SPS packet duplication scheme 300 that supports conditional negative acknowledgement transmission in multi-CC communication in accordance with aspects of the present disclosure. In some examples, multi-CC SPS packet duplication scheme 300 may implement aspects of wireless communications system 100. For instance, multi-CC SPS packet duplication scheme 300 may be implemented by a UE 115 and a base station 105 as described with reference to FIG. 1. Although base-station-to-UE communications are described here, in some cases the methods described herein may be applied for UE-to-UE communications (e.g., the base station 105 as described herein may be replaced with a UE 115). In such cases, communications may involve transmitting and receiving PSSCH transmissions instead of PDSCH transmissions 330.

Multi-CC SPS packet duplication scheme 300 may include a first CC 205-c and a second CC 205-d, each spanning a first time interval 305-a and a second time interval 305-b. CC 205-c may contain time slots 315 and CC 205-d may contain time slots 320. In some cases, time slots of one CC 205 (e.g., one of time slots 315 or 320) may span a different time duration than time slots of another CC 205 (e.g., the other of time slots 315 or 320). For instance, time slots 315 of CC 205-c may span a time duration half that of time slots 315 of CC 205-d. Additionally, a SCS of one CC 205 be different than that of another CC 205. For instance, in the present example, CC 205-c may have an SCS (e.g., 120 kHz) twice that of CC 205-d (e.g., 60 kHz). CC 205-c may be an FR2 CC 205 and CC 205-d may be an FR1 CC 205. In some cases, each time interval 305 may span a millisecond.

The SPS resource occasions 325 may be configured to repeat on a per-cycle or per-time-interval basis and may occur during a same time slot and slot offset. For instance, in the present example SPS resource occasion 325-a may occur at a beginning of a first time slot 315 of time interval 305-a and SPS resource occasion 325-c, which may correspond to SPS resource occasion 325a, may occur at a beginning of a first time slot 315 of time interval 305-b. Likewise, SPS resource occasion 325-b may occur at a beginning of a first time slot 320 of time interval 305-a and SPS resource occasion 325-d, which may correspond to SPS resource occasion 325b, may occur at a beginning of a first time slot 320 of time interval 305-b. In general, the set of SPS resource occasions 325 may repeat for a defined number of time intervals 305 or may continue to repeat until the UE 115 receives an indication that the SPS resource occasions 325 are to cease.

Additionally, SPS resource occasions 325 across multiple CCs 205 may at least partially overlap in time. For instance, SPS resource occasion 325-b of CC 205-d may overlap with SPS resource occasion 325-a of CC 205-c and SPS resource occasion 325-d of CC 205-d may overlap with SPS resource occasion 325-c of CC 205-c. In some cases (e.g., if an SCS of CC 205-c is greater than that of CC 205-d), the SPS resource occasions 325 of CC 205-d may span a time greater than that of SPS resource occasions 325 of CC 205-c by a factor defined as a ratio between the SCS of CC 205-c and CC 205-d. For instance, in one example, if an SCS of CC 205-c is twice that of CC 205-d, SPS resource occasion 325-b may span a time twice that of SPS resource occasion 325-a. Alternatively, SPS resource occasions 325 across the multiple CCs 205 may span a same time interval 305. Such SPS resource occasions 325 may span a different number of symbols in their respective slots.

The UE 115 may receive an indication of the set of CCs 205 for communicating with the base station 105. The indication may be received via control signal (e.g., RRC, MAC-CE, DCI). Additionally, the UE 115 may receive an indication of an SPS resource allocation for duplicate data transmission, where the SPS resource allocation may indicate an SPS resource occasion 325 on which a copy of a data transmission is to be received. The indication of the set of CCs 205 and the set of SPS resource occasions 325 may be sent together or separately. The UE 115 may monitor the indicated SPS resource occasions 325 on each of the set of CCs 205.

In some cases, some or each of the overlapping SPS resource occasions 325 may be configured to carry a duplicate data transmissions (PDSCH transmissions 330 containing same TBs or same PDCP PDUs) from the base station 105, which may enable the base station 105 and the UE 115 to perform communications with increased robustness. The base station 105, in each cycle or time interval 305, may dynamically choose which CCs 205 to send duplicates over from a set of CCs 205. The base station 105 may determine the CCs 205 based on a quality of each of the CCs 205. The base station 105 may determine the quality based on a received NACK 335, a received sounding reference signal (SRS) 340, a transmitted channel state information (CSI) reference signal (CSI-RS), a received CSI report, or a combination thereof. The base station 105 may assign resources for unused SPS resource occasions 325 (e.g., SPS resource occasions 325 in which the base station 105 does not transmit to the UE 115) for other UEs 115.

At an SPS resource occasion 325-a of time interval 305-a in CC 205-c, a UE 115 may fail to receive and/or decode a PDSCH transmission 330-a transmitted from the base station 105. In such cases, the UE 115 may transmit a NACK 335-a to the base station 105 over CC 205-c. Additionally, at an SPS resource occasion 325-b of time interval 305-a in CC 205-d, the UE 115 may not receive a PDSCH transmission 330, as the base station 105 may not have transmitted a PDSCH transmission 330 for the UE 115 for SPS resource occasion 325-b. Thus, the UE 115 may transmit a NACK 335-b over CC 205-d.

Upon transmitting the NACK 335a, the UE 115 may transmit one or more SRS 340 on CC 205-c. For instance, in the present example, the UE 115 may transmit SRSs 340-a and 340-b on CC 205-c to the base station 105. Each SRS 340 may be sent on different beams. Likewise, upon transmitting the NACK 335b, the UE 115 may transmit one or more SRSs 340 on CC 205-d. For instance, the UE 115 may transmit SRS 340-c to the base station 105 on CC 205-d. As described herein, the UE 115 may receive signals from the base station 105 that configure communications at the UE 115. For example, the UE 115 may receive DCI that indicates a configuration (e.g., a resource configuration) for the SRS 340 on CC 205-c. Additionally or alternatively, the UE 115 may identify the configuration at the UE 115 (e.g., the configuration may be associated with uplink resources already agreed upon and granted prior to NACK 335-a and/or 335-b being transmitted). In some such cases, upon RRC connection, establishment, or reestablishment, or RRC reconfiguration, peer entities may determine that each time the UE 115 transmits a NACK 335 (e.g., NACK 335-a and/or 335-b), at a specified time instant after the NACK 335 is transmitted, the UE 115 may transmit uplink SRS 340 on already agreed and granted uplink resources.

Upon receiving the SRSs 340, the base station 105 may use information related to the SRSs 340 to determine a beam for receiving a grant such as physical downlink control channel (PDCCH) 345 on CC 205-d. Using the beam, the base station may receive PDCCH transmission 345-a on CC 205-d. After receiving PDCCH transmission 345a, the base station 105 may receive a PDSCH transmission 330-b on CC 205-d. PDSCH transmission 330-b may be a retransmission of PDSCH transmission 330-a. The UE 115 may successfully decode PDSCH transmission 330-b and may transmit a corresponding ACK 337-a to the base station 105.

SRS 340-c may be occupying a space in time-frequency resources that may interfere with transmissions from other devices. As such, transmitting SRS 340-c may introduce uplink interference into other transmissions, even if an ACK 337 is sent on another CC 205. Methods to limit such interference may be described in further detail with regards to FIG. 4.

During the second time interval 305b, at an SPS resource occasion 325-c in CC 205-d, the UE 115 may not receive a PDSCH transmission 330, as the base station 105 may not have transmitted a PDSCH transmission 330 for the UE 115 for SPS resource occasion 325-c. In such cases, the UE 115 may transmit a NACK 335-c over CC 205-c. At an SPS resource occasion 325-d in CC 205-d, meanwhile, the UE 115 may receive a PDSCH transmission 330-c from the base station 105 and may successfully decode PDSCH transmission 330-c. The UE 115 may send an ACK 337-b to the base station 105.

Upon receiving the ACK 337b, the base station 105 may determine that the UE 115 has successfully decoded PDSCH transmission 330-c. Assuming that any other PDSCH transmissions 330, if any, sent on other overlapping SPS resource occasion 325-d were duplicates of PDSCH transmission 330-c, ACK 337-b may sufficiently enable the base station 105 to determine that the UE 115 successfully decoded and received the data sent during the SPS resource occasions 325 overlapping SPS resource occasion 325-d in time. As such, NACK 335-c may provide information unused by the base station 105 when determining that the UE 115 has successfully decoded and received the data. However, NACK 335-c may occupy time-frequency resources overlapping with other transmissions. As such, NACK 335-c may introduce interference into other transmissions. Methods to limit such interference may be described in further detail with regards to FIG. 4.

Figure 4:
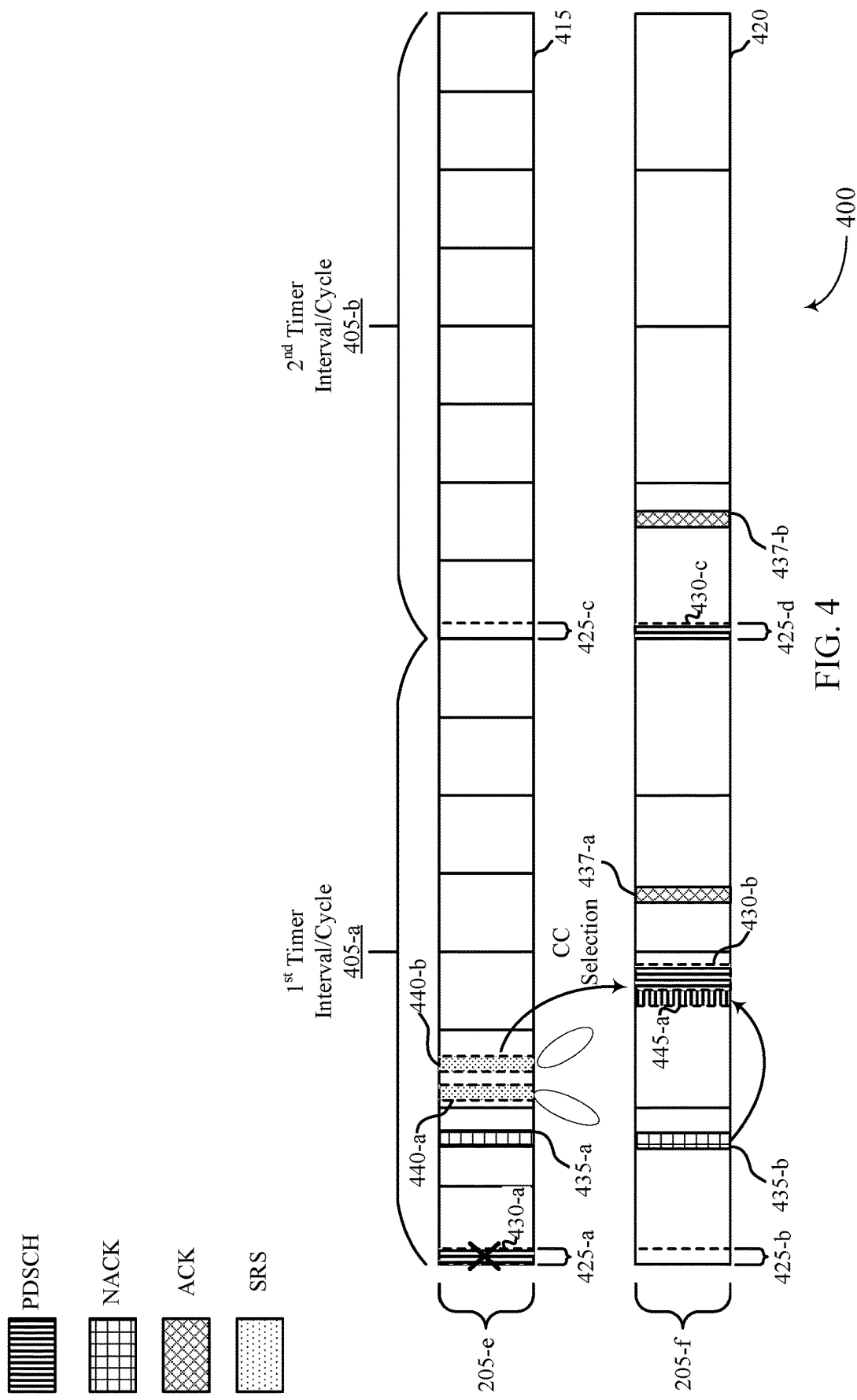
FIG. 4 illustrates an example of a multi-CC SPS packet duplication scheme that supports conditional negative acknowledgement transmission in multi-CC communication in accordance with aspects of the present disclosure.

FIG. 4 illustrates an example of a multi-CC SPS packet duplication scheme 400 that supports conditional negative acknowledgement transmission in multi-CC communication in accordance with aspects of the present disclosure. In some examples, multi-CC SPS packet duplication scheme 400 may implement aspects of wireless communications system 100. For instance, multi-CC SPS packet duplication scheme 300 may be implemented by a UE 115 and a base station 105 as described with reference to FIG. 1. Although base-station-to-UE communications are described here, in some cases the methods described herein may be applied for UE-to-UE communications (e.g., the base station 105 as described herein may be replaced with a UE 115). In such cases, communications may involve transmitting and receiving PSSCH transmissions instead of PDSCH transmissions 430.

Multi-CC SPS packet duplication scheme 400 may include a first CC 205-e and a second CC 205-f, each spanning a first time interval 405-a and a second time interval 405-b. CC 205-e may contain time slots 415 and CC 205-f may contain time slots 420. In some cases, time slots of one CC 205 (e.g., one of time slots 415 or 420) may span a different time duration than time slots of another CC 205 (e.g., the other of time slots 420 or 415). For instance, time slots 415 of CC 205-e may span a time duration half that of time slots 415 of CC 205-f. Additionally, a SCS of one CC 205 be different than that of another CC 205. For instance, in the present example, CC 205-e may have an SCS (e.g., 120 kHz) twice that of CC 205-f (e.g., 60 kHz). CC 205-e may be an FR2 CC 205 and CC 205-f may be an FR1 CC 205.

The SPS resource occasions 425 may be configured to repeat on a per-cycle or per-time-interval basis and may occur during a same time slot and slot offset. For instance, SPS resource occasion 425-a may occur at a beginning of a first time slot 415 of time interval 405-a and SPS resource occasion 425-c, which may correspond to SPS resource occasion 425a, may occur at a beginning of a first time slot 415 of time interval 405-b. Likewise, SPS resource occasion 425-b may occur at a beginning of a first time slot 420 of time interval 405-a and SPS resource occasion 425-d, which may correspond to SPS resource occasion 425b, may occur at a beginning of a first time slot 420 of time interval 405-b. The set of SPS resource occasions 425 may repeat for a defined number of time intervals 405 or may continue to repeat until the UE receives an indication that the SPS resource occasions 425 are to cease.

Additionally, SPS resource occasions 425 across multiple CCs 205 may at least partially overlap in time. For instance, SPS resource occasion 425-b of CC 205-f may overlap with SPS resource occasion 425-a of CC 205-e and SPS resource occasion 425-d of CC 205-f may overlap with SPS resource occasion 425-c of CC 205-e. In some cases (e.g., if an SCS of CC 205-e is greater than that of CC 205-f), the SPS resource occasions 425 of CC 205-f may span a time greater than that of SPS resource occasions 425 of CC 205-e by a factor defined as a ratio between the SCS of CC 205-e and CC 205-f. For instance, in one example, if an SCS of CC 205-e is twice that of CC 205-f, SPS resource occasion 425-b may span a time twice that of SPS resource occasion 425-a. Alternatively, SPS resource occasions 425 across the multiple CCs 205 may span a same time. Such SPS resource occasions 425 may span a different number of symbols in their respective slots.

The UE 115 may receive an indication of the set of CCs 205 for communicating with the base station 105. The indication may be received via control signal (e.g., RRC, MAC-CE, DCI). Additionally, the UE 115 may receive an indication of SPS resource allocation for duplicate data transmission that indicates a SPS resource occasion 425 on which a copy of a data transmission is to be received. The indication of the set of CCs 205 and the set of SPS resource occasions 425 may be sent together or separately. The UE 115 may monitor the indicated SPS resource occasions 425 on each of the set of CCs 205.

Some or each of the overlapping SPS resource occasions 425 may be configured to carry a duplicate data transmission (PDSCH transmissions 430 containing same TBs or same PDCP PDUs) from the base station 105, which may enable the base station 105 and the UE 115 to perform communications with increased robustness. The base station 105, in each cycle or time interval 405, may dynamically choose which CCs 205 to send duplicates over from a set of CCs 205. The base station 105 may determine the CCs 205 based on a quality of each of the CCs 205. The base station 105 may determine the quality based on a received NACK 435, a received SRS 440, a transmitted CSI-RS, a received CSI report, or a combination thereof. The base station 105 may assign resources for unused SPS resource occasions 425 (e.g., SPS resource occasions 425 in which the base station 105 does not transmit to the UE 115) for other UEs 115. In some cases, the base station 105 may indicate the set of SPS configuration IDs for TB duplication on multiple CCs 205.

At an SPS resource occasion 425-a of time interval 405-a in CC 205-e, a UE 115 may fail to receive and/or decode a PDSCH transmission 430-a transmitted from the base station 105. In such cases, the UE 115 may transmit a NACK 435-a to the base station over CC 205-e. Additionally, at an SPS resource occasion 425-b of time interval 405-a in CC 205-f, the UE 115 may not receive a PDSCH transmission 430, as the base station 105 may not have transmitted a PDSCH for the UE 115 for SPS resource occasion 425-b. Thus, the UE 115 may transmit a NACK 435-b over CC 205-f.

Upon transmitting the NACK 435a, the UE 115 may transmit one or more SRSs 440 on CC 205-e. For instance, in the present example, the UE 115 may transmit SRS 440-a and 440-b on CC 205-e to the base station 105. Each SRS 440 may be sent on different beams. However, upon transmitting the NACK 435b, the UE 115 may refrain from transmitting SRSs 440 on CC 205-f.

In some examples, if no PDSCH is decoded from any of the SPS resource occasions 425 in a time interval 405 (e.g., in time interval 405-a), the UE 115 may send SRS 440 with beam sweep on an FR2 CC 205 (e.g., CC 205-f) and may send a NACK on a FR1 CC 205. Both the NACK and the SRS 440 may be used to sound CC qualities for CC selection in retransmission. For instance, instead of using a SRS 440 in CC 205-f to select CCs 205 for a retransmission, the base station 105 may use the NACK 435-a. By refraining from transmitting SRSs 440, the UE 115 may prevent interference from occurring in the time-frequency resources where an SRS 440 would be sent in CC 205-f. In some cases, upon lack of detection of the expected packet at CC 205-f, the UE 115 may apply a discontinuous transmission (DTX). In some examples, DTX may be what a wireless device (e.g., a UE 115 or a base station 105) applies by not transmitting something at a given time instant (e.g., when the wireless device may otherwise have transmitted a transmission, such as a NACK). The base station 105, determining that packet transmission did not take place in downlink at a given time instant (e.g., during an SPS resource occasion 425), may apply discontinuous reception (DRX) or may allocate resources to another UE 115 at a moment when the base station 105 expects feedback from the UE 115. DRX may be a state in which a wireless device (e.g., a UE 115 or a base station 105) goes into an idle or sleep mode by deactivating receivers and not receiving anything. In one example, if the base station 105 does not transmit a PDSCH transmission 430 during SPS resource occasion 425-c, the base station 105 may not receive a NACK 435 from the UE 115 and may apply DRX or may allocate resources for another UE 115 for a time duration during which the UE 115 may otherwise have sent the NACK 435.

Upon receiving the SRSs 440, the base station 105 may use information related to the SRSs 440 and NACK 435-a to determine a beam for receiving a grant, such as PDCCH transmission 445-a on CC 205-f. Using the beam, the base station 105 may transmit PDCCH transmission 445-a on CC 205-f. After transmitting PDCCH transmission 445a, the base station 105 may transmit a PDSCH transmission 430-b on CC 205-f. PDSCH transmission 430-b may include a copy of data within PDSCH transmission 430-a (e.g., a duplicate TB). The UE 115 may successfully decode PDSCH transmission 430-b and may transmit a corresponding ACK 437-a to the base station 105.

During the second time interval 405b, at an SPS resource occasion 425-c in CC 205-f, the UE 115 may not receive a PDSCH transmission 430, as the base station 105 may not have transmitted a PDSCH transmission 430 for the UE 115 for SPS resource occasion 425-b. However, at an SPS resource occasion 425-d in CC 205-f, the UE 115 may receive a PDSCH transmission 430-c from the base station 105 and may successfully decode PDSCH transmission 430-c. The UE 115 may send an ACK 437-b to the base station 105. In cases where the base station 105 transmits a PDSCH transmission 430 over SPS resource occasion 425-c and the UE 115 successfully receives and decodes PDSCH transmission 430-c and the PDSCH transmission 430 over SPS resource occasion 425-c, the UE 115 may still send a single ACK 437.

Assuming that no other PDSCH transmissions 430 on other overlapping resources occasions (e.g., SPS resource occasion 425-c) were duplicates on CC 205-e of PDSCH transmission 430-c (e.g., in another CC 205), the ACK 437-b may sufficiently enable the base station 105 to determine that the UE 115 received the information sent during the preceding resource occasion. As such, the UE 115 may not send a NACK on CC 205-e, even though the UE 115 did not receive a PDSCH transmission 430 during SPS resource occasion 425-c. By refraining from transmitting the NACK 435 on CC 205-e, the UE 115 may prevent interference from occurring in the time-frequency resources where a NACK would be sent in CC 205-e. In another example, still assuming the UE 115 transmits an ACK 437 on at least one CC 205 (e.g., CC 205-f in the present example), the UE 115 may apply DTX on other CCs 205 indicating that no PDSCH transmission 430 was decoded on that CC 205, which may reduce interference (e.g., not transmit feedback on CC 205-e after not being able to decode PDSCH 402 in SPS resource occasion 425-c). By not sending a NACK 435 on CC 205-e when an ACK 437 is sent on a different CC 205 (e.g., CC 205-f), the UE 115 may reduce interference on CC 205-e and other surrounding frequency resources.

In some cases, the base station 105 may transmit, to the UE 115, an indication of the set of SPS configuration IDs for TB duplication on multiple CCs 205. For the indicated SPS configuration IDs, the UE 115 may skip sending an ACK 437 on at least one CC 205 and may send DTX on other CCs 205 that no PDSCH is decoded to reduce interference, as described herein. Also for the indicated SPS configuration IDs, if no PDSCH is decoded on any of the configured CCs 205, the UE 115 may transmit a reference signal (e.g., SRS 440) with beam sweep on one or more FR2 CCs 205 and a NACK on FR1 CCs 205, and the reference signal transmission and the NACK transmission on the respective CCs 205 may be used to sound CC qualities to enable for the base station 105 to select on which one or more CCs 205 to perform retransmission.

Figure 5:
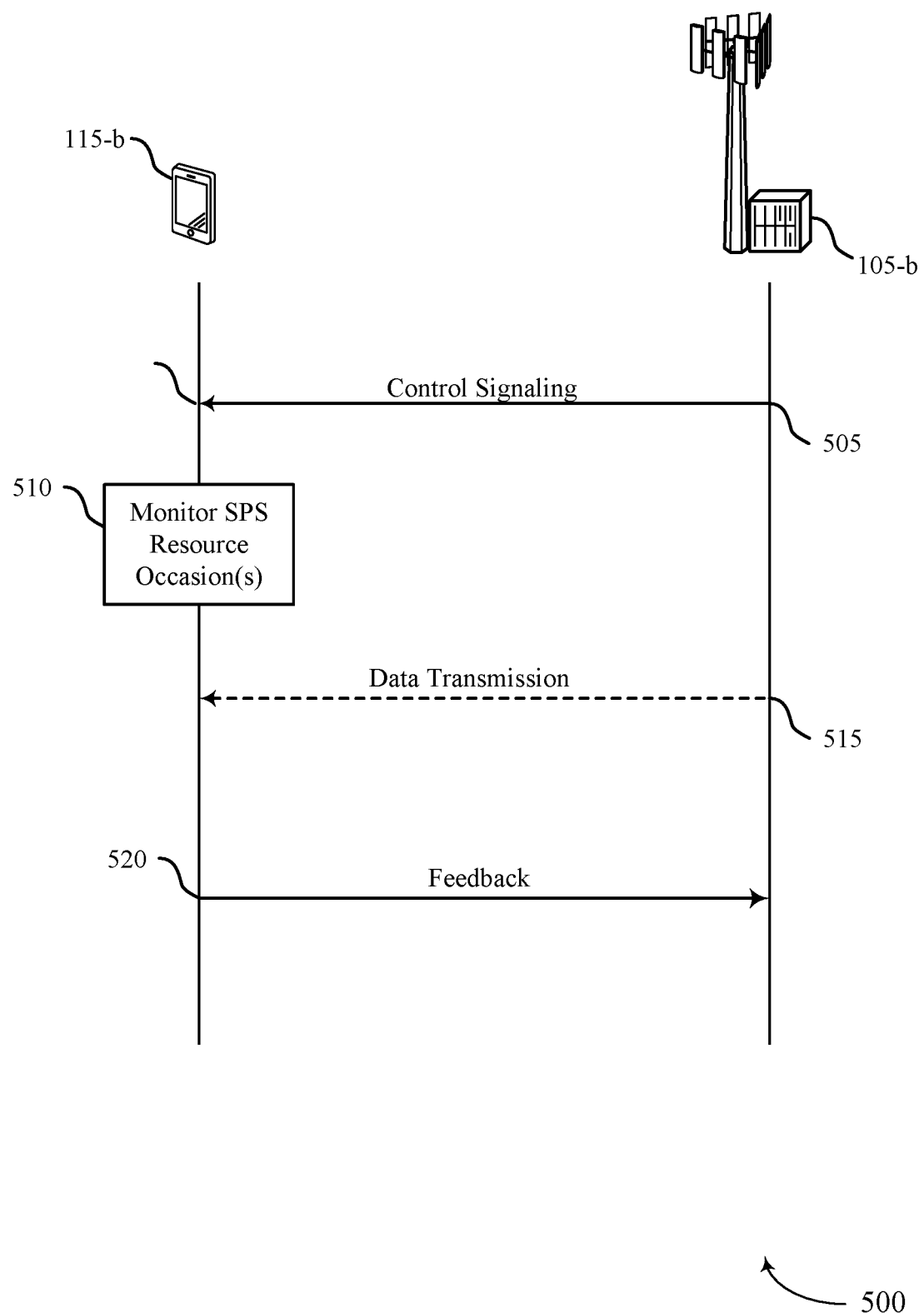
FIG. 5 illustrates an example of a process flow that supports conditional negative acknowledgement transmission in multi-CC communication in accordance with aspects of the present disclosure.

FIG. 5 illustrates an example of a process flow 500 that supports conditional negative acknowledgement transmission in multi-CC communication in accordance with aspects of the present disclosure. In some examples, process flow 500 may implement aspects of wireless communications system 100. For instance, process flow 500 may be implemented by base station 105-b and UE 115b, which may be examples of a base station 105 and UE 115 as described with reference to FIG. 1. In some cases, base station 105-b may be replaced by a UE 115 without deviating from the scope of the present disclosure.

At 505, base station 105-b may transmit control signaling (e.g., DCI, MAC-CE, RRC) configuring UE 115-b with a set of frequency resources (e.g., a set of CCs) for communicating with base station 105-b. Additionally, the control signaling may indicate a SPS resource allocation for duplicate data transmission (e.g., PDSCH, or PSSCH if base station 105-b is replaced with a UE 115). The SPS resource allocation on each of the set of frequency resources in which a copy of a data transmission is to be communicated. UE 115-b may receive the control signaling. In some cases, the SPS resource allocation may indicate one or more of the SPS resource occasions is configured on each of the set of frequency resources for a defined number of time intervals. In some cases, base station 105-b may transmit an indication of a set of SPS IDs for duplicate data transmission on the set of frequency resources and UE 115-b may receive the indication.

At 510, UE 115-b may monitor the SPS resource occasion on each of the set of frequency resources for a copy of the data transmission.

At 515, base station 105-b may transmit, via at least one of the SPS resource occasions, a copy of the data transmission on one or more frequency resources of the set of frequency resources. UE 115-b may receive the copy of the data transmission.

At 520, UE 115-b may transmit feedback to base station 105-b. If base station 105-b transmitted the copy of the data transmission at 515 and UE 115-b successfully decoded the copy of the data transmission, UE 115-b may transmit an acknowledgement message (e.g., an ACK) via a first frequency resource (e.g., a first CC) of the set of frequency resources. If transmitting the acknowledgement message, UE 115-b may determine to skip transmission of a feedback message (e.g., an ACK or a NACK) via a second frequency resource of the set of frequency resources. In some cases, UE 115-b may apply a discontinuous transmission (e.g., a DTX transmission) via the second frequency resource during an occasion for transmitting the feedback message. In another example, if base station 105-b did not transmit the copy of the data transmission at 515 or UE 115-b failed to decode the received transmission, UE 115-b may transmit a negative acknowledgement message (e.g., a NACK) via the first frequency resource of the set of frequency resources.

Figure 6:
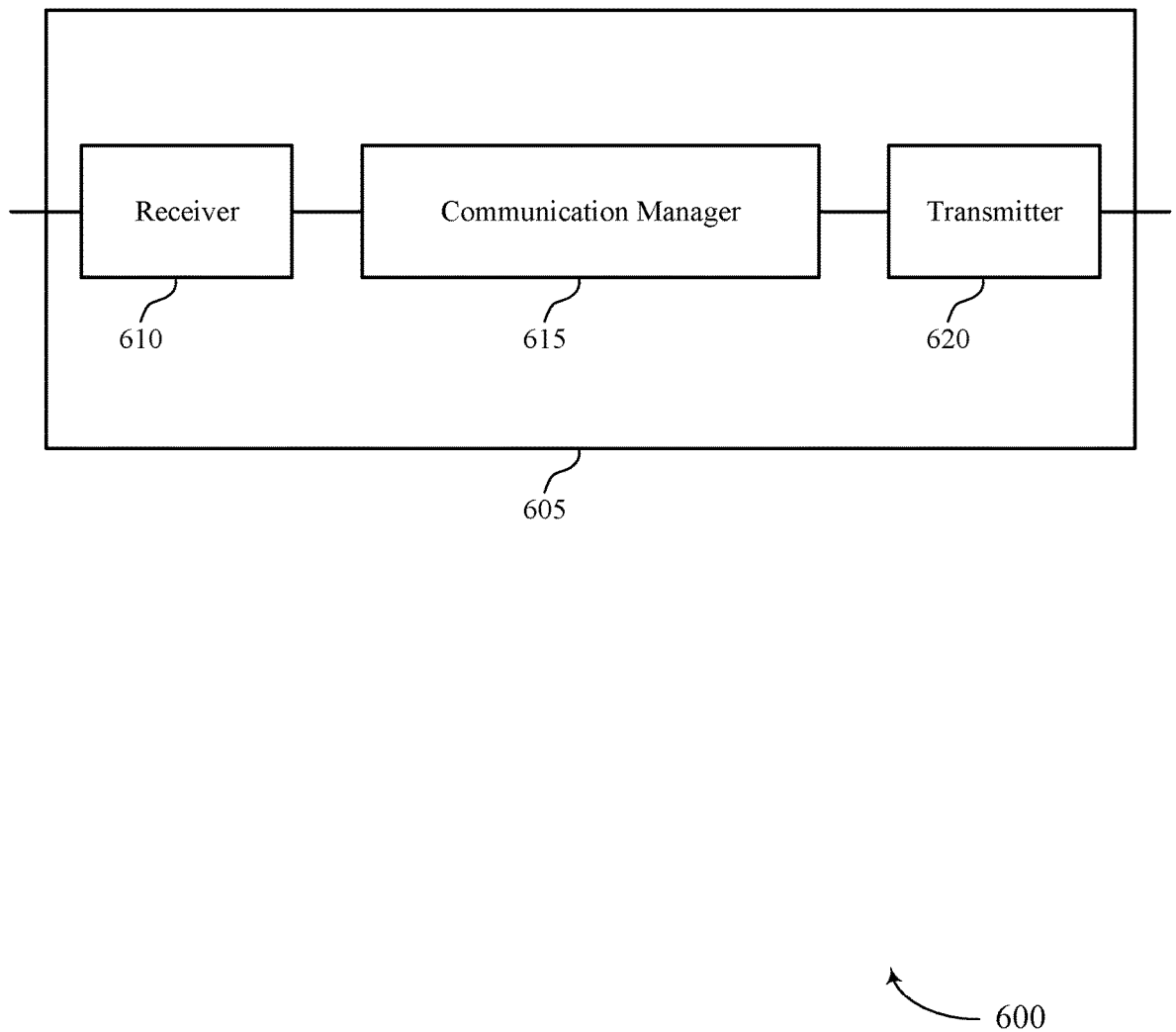
FIGS. 6 and 7 show diagrams of devices that support conditional negative acknowledgement transmission in multi-CC communication in accordance with aspects of the present disclosure.

FIG. 6 shows a diagram 600 of a device 605 that supports conditional negative acknowledgement transmission in multi-CC communication in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to conditional negative acknowledgement transmission in multi-CC communication, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, monitor the semi-persistent resource occasion on each of the set of frequency resources for a copy of the data transmission, and transmit an acknowledgement message via a first frequency resource of the set of frequency resources based on at least one copy of the data transmission being decoded from the semi-persistent resource occasion on at least one frequency resource of the set of frequency resources. The communication manager 615 may also receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, monitor the semi-persistent resource occasion on each of the set of frequency resources for a copy of the data transmission, and transmit a negative acknowledgement message via a first frequency resource of the set of frequency resources based on failing to decode the data transmission from the semi-persistent resource occasion on any of the set of frequency resources. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
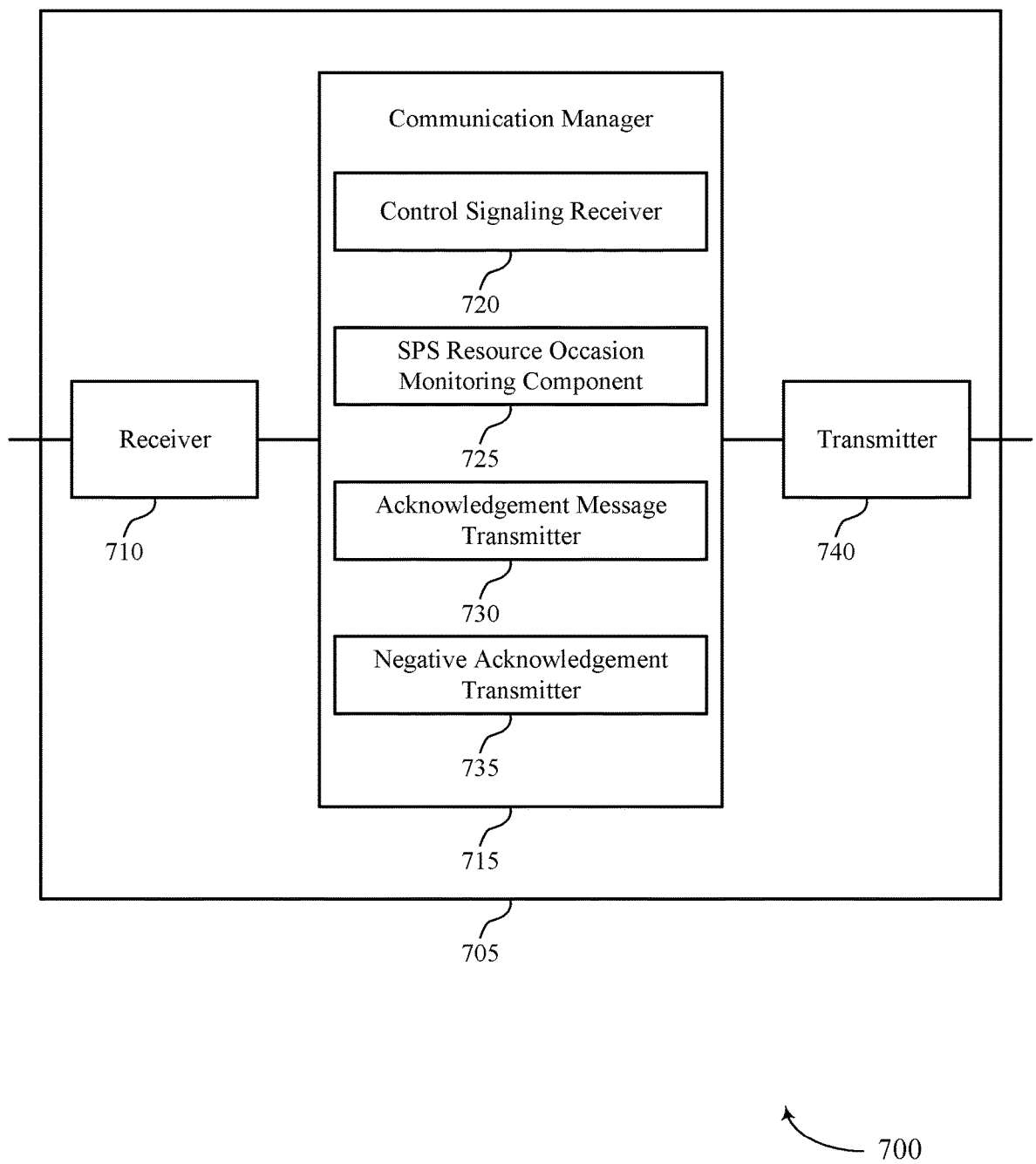

FIG. 7 shows a diagram 700 of a device 705 that supports conditional negative acknowledgement transmission in multi-CC communication in accordance with aspects of the present disclosure. The device 705 may be an example of aspects of a device 605, or a UE 115 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to conditional negative acknowledgement transmission in multi-CC communication, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a control signaling receiver 720, a SPS resource occasion monitoring component 725, an acknowledgement message transmitter 730, and a negative acknowledgement transmitter 735. The communication manager 715 may be an example of aspects of the communication manager 910 described herein.

The control signaling receiver 720 may receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated. The control signaling receiver 720 may receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated.

The SPS resource occasion monitoring component 725 may monitor the semi-persistent resource occasion on each of the set of frequency resources for a copy of the data transmission. The SPS resource occasion monitoring component 725 may monitor the semi-persistent resource occasion on each of the set of frequency resources for a copy of the data transmission.

The acknowledgement message transmitter 730 may transmit an acknowledgement message via a first frequency resource of the set of frequency resources based on at least one copy of the data transmission being decoded from the semi-persistent resource occasion on at least one frequency resource of the set of frequency resources.

The negative acknowledgement transmitter 735 may transmit a negative acknowledgement message via a first frequency resource of the set of frequency resources based on failing to decode the data transmission from the semi-persistent resource occasion on any of the set of frequency resources.

The transmitter 740 may transmit signals generated by other components of the device 705. In some examples, the transmitter 740 may be collocated with a receiver 710 in a transceiver module. For example, the transmitter 740 may be an example of aspects of the transceiver 915 described with reference to FIG. 9. The transmitter 740 may utilize a single antenna or a set of antennas.

Figure 8:
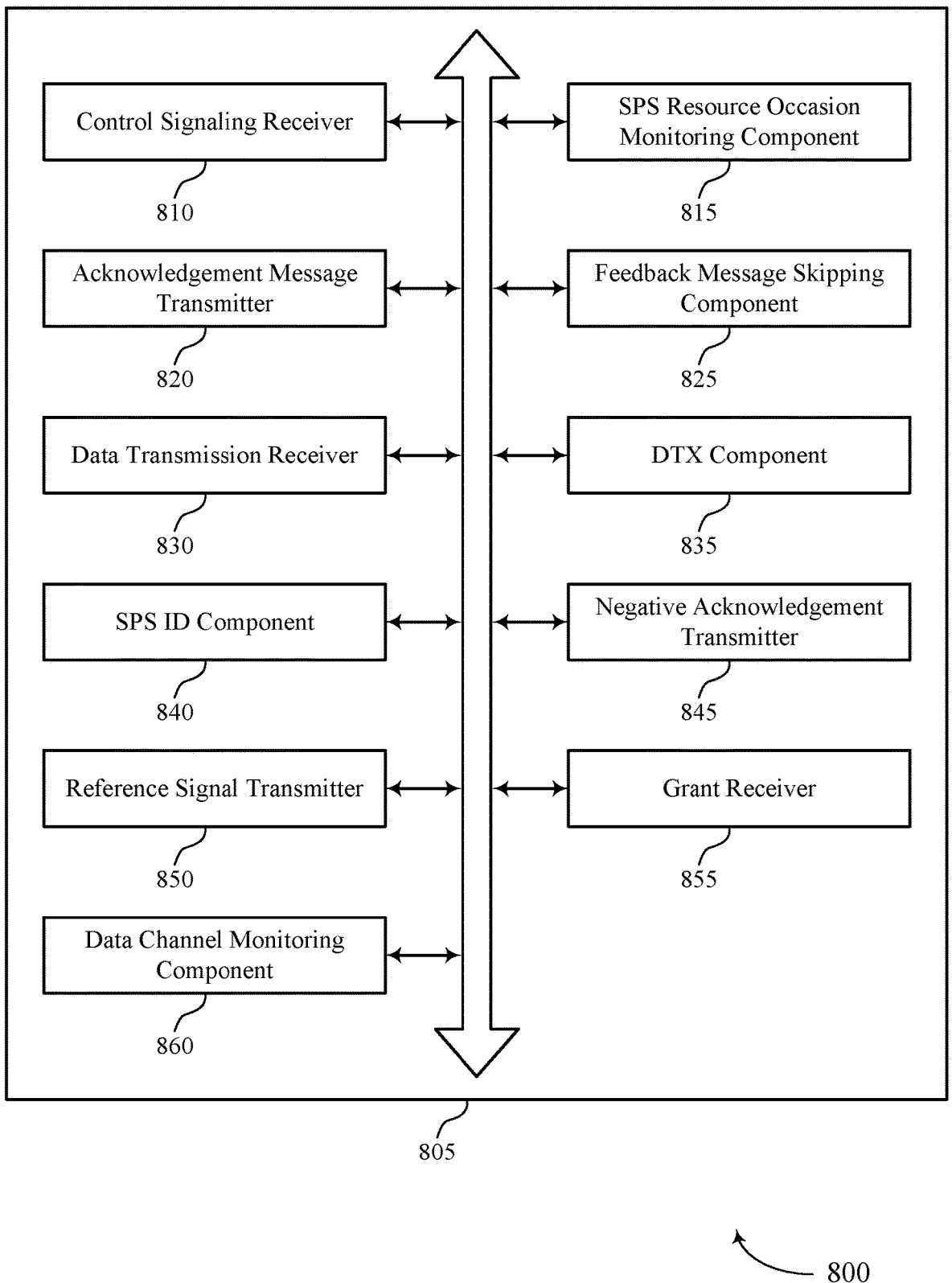
FIG. 8 shows a diagram of a communication manager that supports conditional negative acknowledgement transmission in multi-CC communication in accordance with aspects of the present disclosure.

FIG. 8 shows a diagram 800 of a communication manager 805 that supports conditional negative acknowledgement transmission in multi-CC communication in accordance with aspects of the present disclosure. The communication manager 805 may be an example of aspects of a communication manager 615, a communication manager 715, or a communication manager 910 described herein. The communication manager 805 may include a control signaling receiver 810, a SPS resource occasion monitoring component 815, an acknowledgement message transmitter 820, a feedback message skipping component 825, a data transmission receiver 830, a DTX component 835, a SPS ID component 840, a negative acknowledgement transmitter 845, a reference signal transmitter 850, a grant receiver 855, and a data channel monitoring component 860. Each of these modules may communicate, directly or indirectly, with one another (e.g., via one or more buses).

The control signaling receiver 810 may receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated.

In some examples, the control signaling receiver 810 may receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated.

In some examples, the control signaling receiver 810 may receive the semi-persistent resource allocation that indicates the semi-persistent resource occasion is configured on each of the set of frequency resources for a defined number of time intervals. In some examples, the control signaling receiver 810 may receive the semi-persistent resource allocation that indicates the semi-persistent resource occasion is configured on each of the set of frequency resources for a defined number of time intervals. In some examples, the control signaling receiver 810 may receive an indication of a set of semi-persistent IDs configured for duplicate data transmission on the set of frequency resources. In some examples, the control signaling receiver 810 receiving the control signaling may include the control signaling receiver 810 receiving control signaling configuring a feedback scheme at the UE. In some examples, the control signaling receiver 810 may receive downlink control information indicating a configuration for the sounding reference signal and associated with the first frequency resource.

The SPS resource occasion monitoring component 815 may monitor the semi-persistent resource occasion on each of the set of frequency resources for a copy of the data transmission. In some examples, the SPS resource occasion monitoring component 815 may monitor the semi-persistent resource occasion on each of the set of frequency resources for a copy of the data transmission.

The acknowledgement message transmitter 820 may transmit an acknowledgement message via a first frequency resource of the set of frequency resources based on at least one copy of the data transmission being decoded from the semi-persistent resource occasion on at least one frequency resource of the set of frequency resources. In some examples, transmitting the acknowledgement message via the first resource may be based on the control signaling configuring the feedback scheme.

The feedback message skipping component 825 may determine to skip transmission of a feedback message via a second frequency resource of the set of frequency resources based on transmitting the acknowledgement message via the first frequency resource.

The data transmission receiver 830 may receive the copy of the data transmission via the first frequency resource, one or more other frequency resources of the set of frequency resources, or both. The DTX component 835 may apply a discontinuous transmission via the second frequency resource during an occasion for transmitting the feedback message. The SPS ID component 840 may receive an indication of a set of semi-persistent IDs configured for duplicate data transmission on the set of frequency resources.

The negative acknowledgement transmitter 845 may transmit a negative acknowledgement message via a first frequency resource of the set of frequency resources based on failing to decode the data transmission from the semi-persistent resource occasion on any of the set of frequency resources. In some examples, transmitting the negative acknowledgement message via the first resource may be based on the control signaling configuring the feedback scheme.

The reference signal transmitter 850 may transmit a reference signal (e.g., a sounding reference signal) via a set of beams using the first frequency resource. The reference signal transmitter 850 may transmit the sounding reference signal based on the configuration of the sounding reference signal received by control signaling receiver 810. Additionally or alternatively, the reference signal transmitter 850 may identify a configuration for the sounding reference signal and associated with the first frequency resource and may transmit the sounding reference signal based on the identified configuration.

The grant receiver 855 may receive, via a control channel of the first frequency resource, a grant scheduling a retransmission of the data transmission. The data channel monitoring component 860 may monitor a data channel of the first frequency resource for the retransmission of the data transmission based on the grant.

Figure 9:
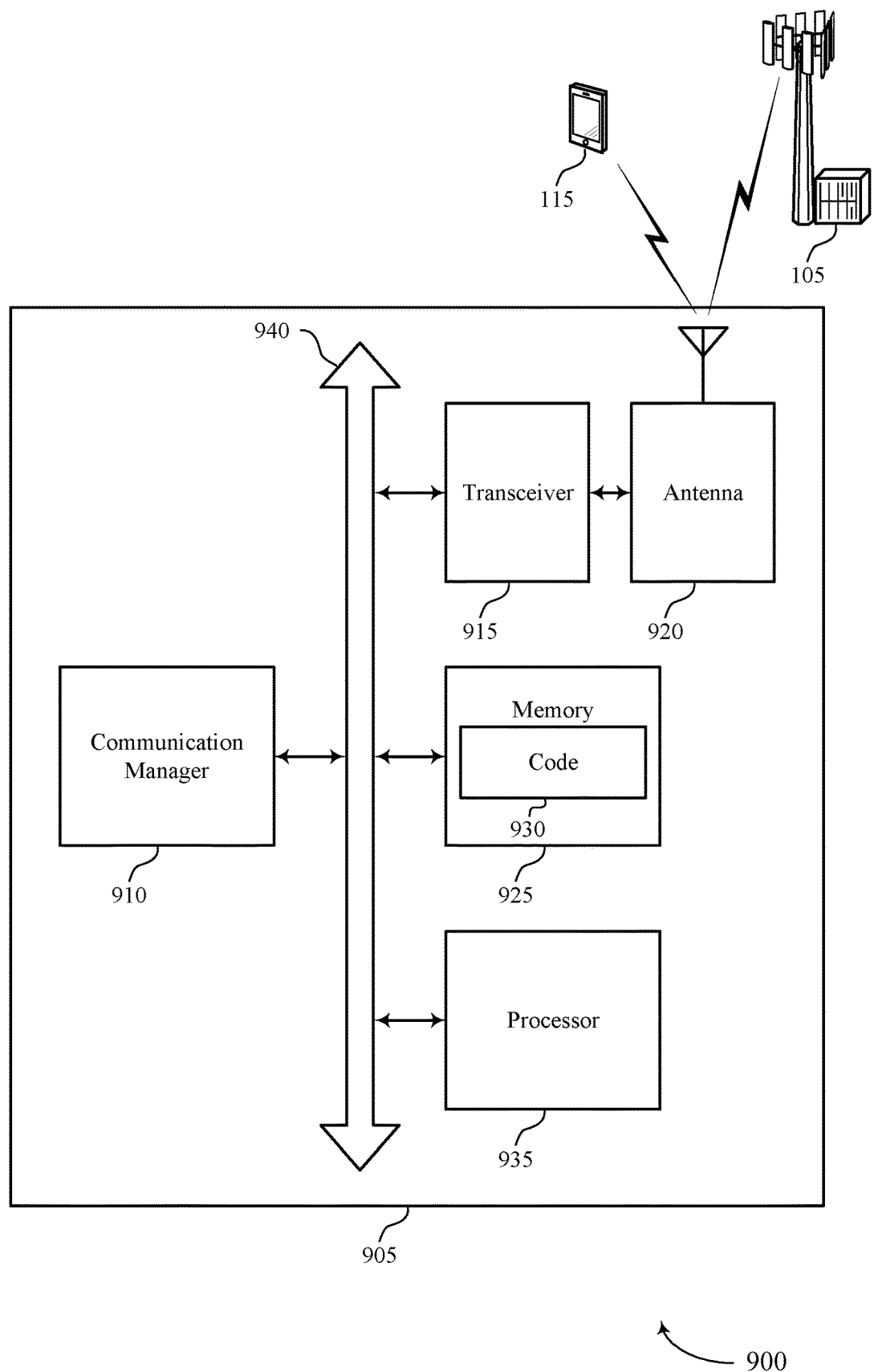
FIG. 9 shows a diagram of a system including a device that supports conditional negative acknowledgement transmission in multi-CC communication in accordance with aspects of the present disclosure.

FIG. 9 shows a diagram of a system 900 including a device 905 that supports conditional negative acknowledgement transmission in multi-CC communication in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated, monitor the semi-persistent resource occasion on each of the set of frequency resources for a copy of the data transmission, and transmit an acknowledgement message via a first frequency resource of the set of frequency resources based on at least one copy of the data transmission being decoded from the semi-persistent resource occasion on at least one frequency resource of the set of frequency resources. The communication manager 910 may also receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated, monitor the semi-persistent resource occasion on each of the set of frequency resources for a copy of the data transmission, and transmit a negative acknowledgement message via a first frequency resource of the set of frequency resources based on failing to decode the data transmission from the semi-persistent resource occasion on any of the set of frequency resources.

The transceiver 915 may communicate bi-directionally, via one or more antennas, wired, or wireless links as described herein. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting conditional negative acknowledgement transmission in multi-CC communication).

Figure 10:
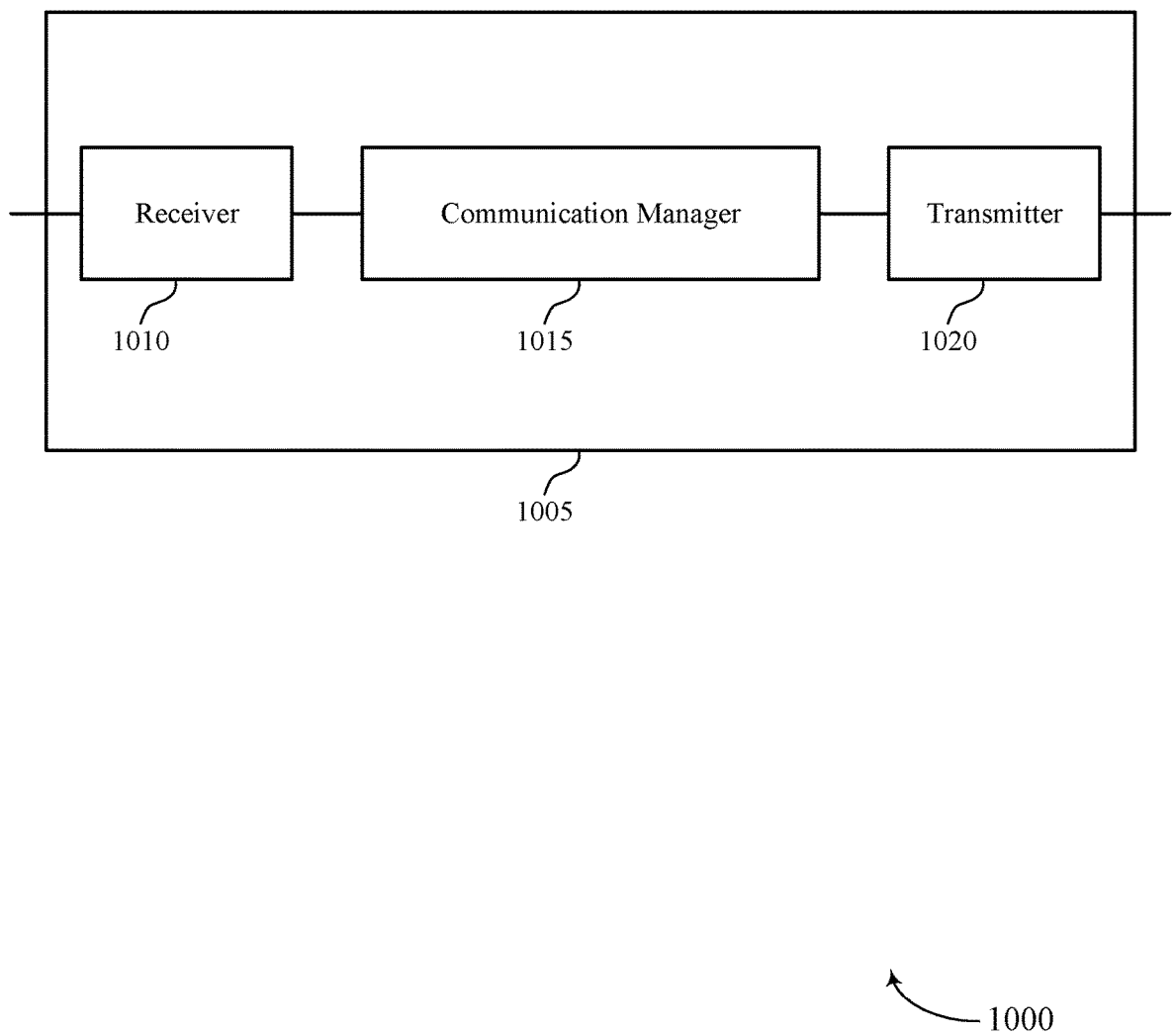
FIGS. 10 and 11 show diagrams of devices that support conditional negative acknowledgement transmission in multi-CC communication in accordance with aspects of the present disclosure.

FIG. 10 shows a diagram 1000 of a device 1005 that supports conditional negative acknowledgement transmission in multi-CC communication in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to conditional negative acknowledgement transmission in multi-CC communication, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, transmit, via the semi-persistent resource occasion, a copy of the data transmission on one or more frequency resources of the set of frequency resources, and receive an acknowledgement message via a first frequency resource of the set of frequency resources based on at least one copy of the data transmission being decoded by the UE from the semi-persistent resource occasion on at least one frequency resource of the set of frequency resources. The communication manager 1015 may also transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, transmit, via the semi-persistent resource occasion, a copy of the data transmission on one or more frequency resources of the set of frequency resources, and receive a negative acknowledgement message via a first frequency resource of the set of frequency resources based on the UE failing to decode the data transmission from the semi-persistent resource occasion on any of the set of frequency resources. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
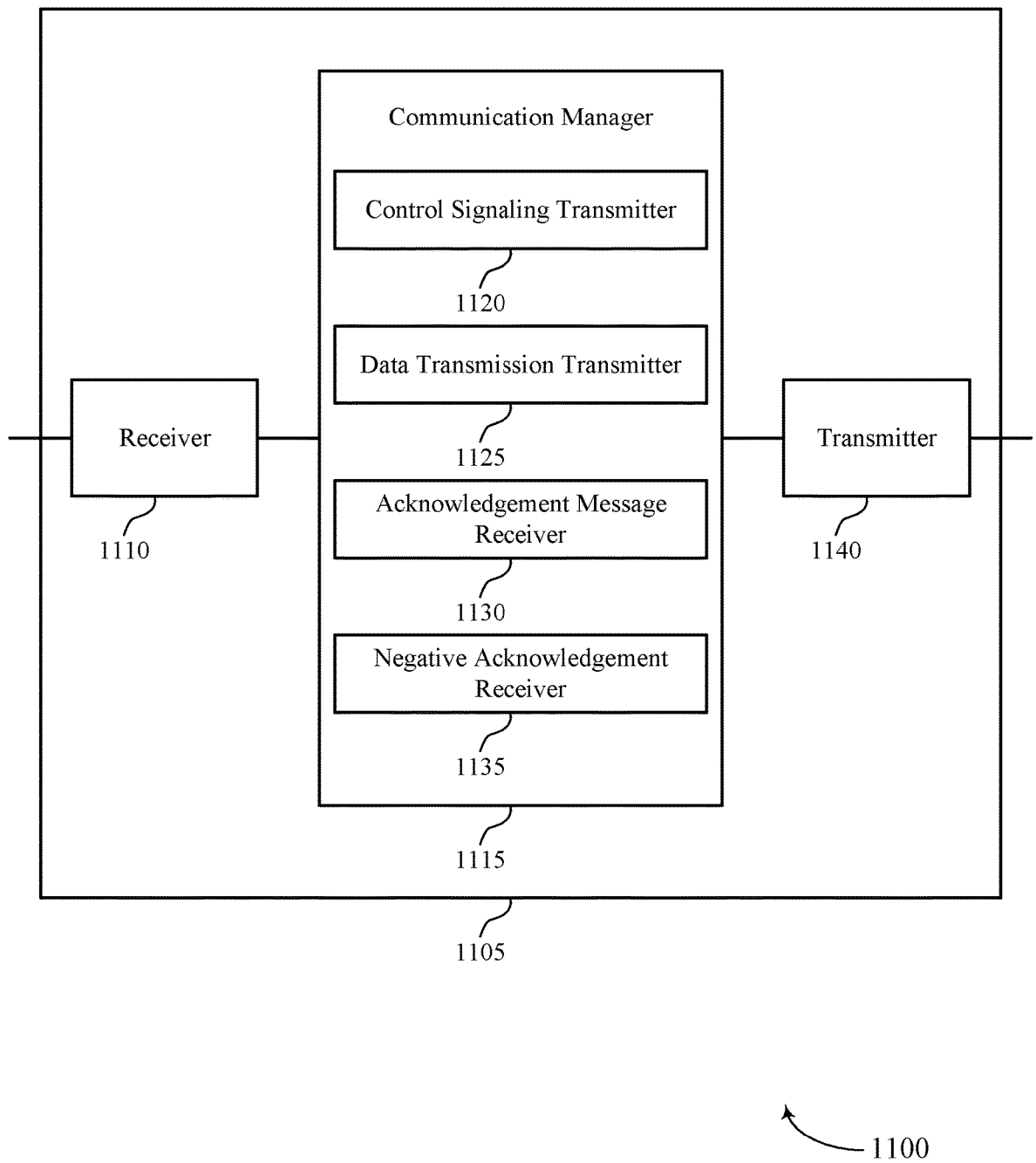

FIG. 11 shows a diagram 1100 of a device 1105 that supports conditional negative acknowledgement transmission in multi-CC communication in accordance with aspects of the present disclosure. The device 1105 may be an example of aspects of a device 1005, or a base station 105 as described herein. The device 1105 may include a receiver 1110, a communication manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to conditional negative acknowledgement transmission in multi-CC communication, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a control signaling transmitter 1120, a data transmission transmitter 1125, an acknowledgement message receiver 1130, and a negative acknowledgement receiver 1135. The communication manager 1115 may be an example of aspects of the communication manager 1310 described herein.

The control signaling transmitter 1120 may transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated. The control signaling transmitter 1120 may transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated. In some examples, the control signaling transmitter 1120 transmitting the control signaling may involve the control signaling transmitter 1120 transmitting control signaling configuring a feedback scheme at the UE.

The data transmission transmitter 1125 may transmit, via the semi-persistent resource occasion, a copy of the data transmission on one or more frequency resources of the set of frequency resources.

The acknowledgement message receiver 1130 may receive an acknowledgement message via a first frequency resource of the set of frequency resources based on at least one copy of the data transmission being decoded by the UE from the semi-persistent resource occasion on at least one frequency resource of the set of frequency resources. In some examples, receiving the acknowledgement message via the first frequency resource may be based on the control signaling configuring the feedback scheme.

The negative acknowledgement receiver 1135 may receive a negative acknowledgement message via a first frequency resource of the set of frequency resources based on the UE failing to decode the data transmission from the semi-persistent resource occasion on any of the set of frequency resources. In some examples, receiving the negative acknowledgement message via the first frequency resource may be based on the control signaling configuring the feedback scheme.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
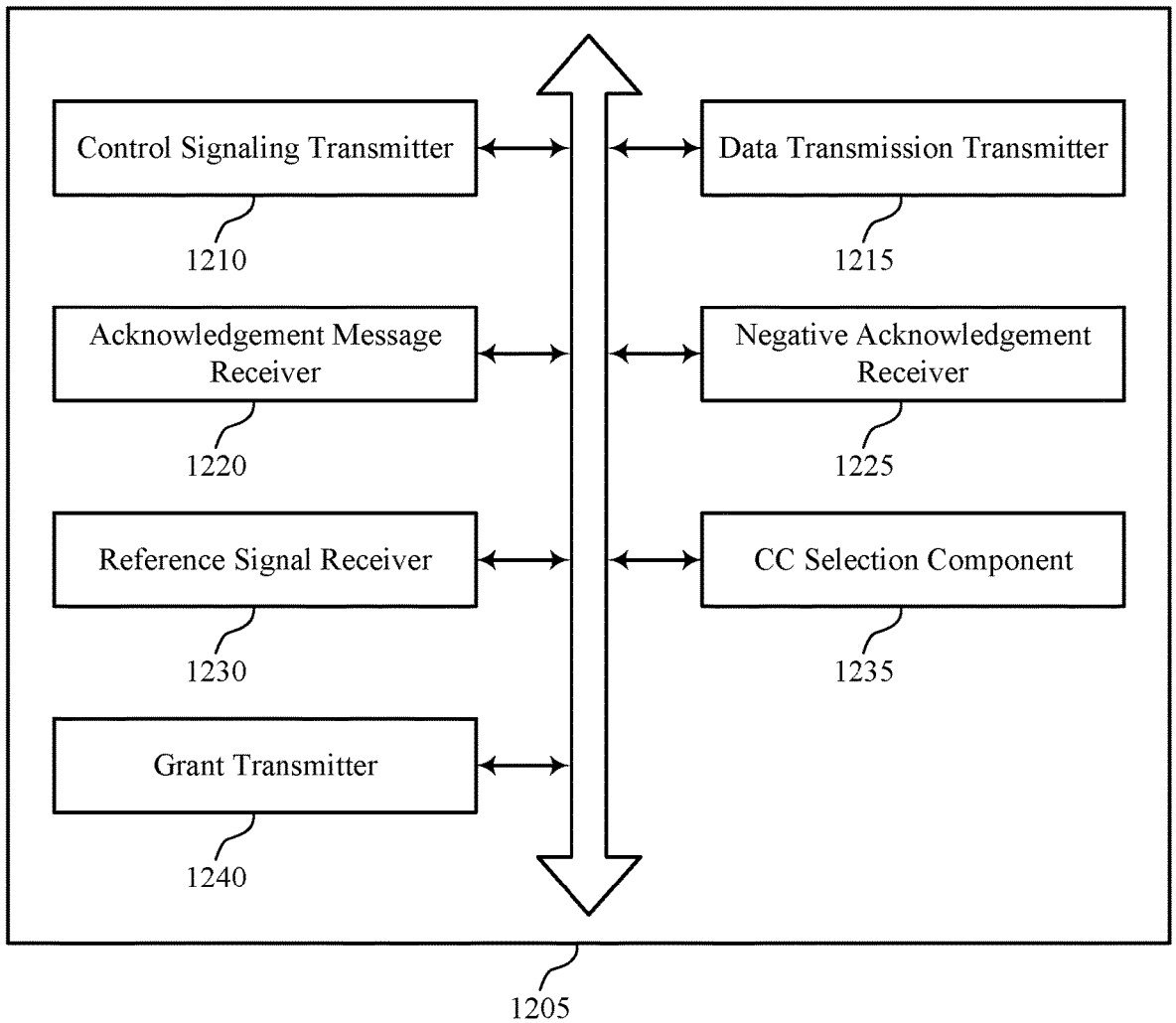
FIG. 12 shows a diagram of a communication manager that supports conditional negative acknowledgement transmission in multi-CC communication in accordance with aspects of the present disclosure.

FIG. 12 shows a diagram 1200 of a communication manager 1205 that supports conditional negative acknowledgement transmission in multi-CC communication in accordance with aspects of the present disclosure. The communication manager 1205 may be an example of aspects of a communication manager 1015, a communication manager 1115, or a communication manager 1310 described herein. The communication manager 1205 may include a control signaling transmitter 1210, a data transmission transmitter 1215, an acknowledgement message receiver 1220, a negative acknowledgement receiver 1225, a reference signal receiver 1230, a CC selection component 1235, and a grant transmitter 1240. Each of these modules may communicate, directly or indirectly, with one another (e.g., via one or more buses).

The control signaling transmitter 1210 may transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated. In some examples, the control signaling transmitter 1210 may transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated. In some examples, the control signaling transmitter 1210 may transmit the semi-persistent resource allocation that indicates the semi-persistent resource occasion is configured on each of the set of frequency resources for a defined number of time intervals. In some examples, the control signaling transmitter 1210 may transmit an indication of a set of semi-persistent IDs configured for duplicate data transmission on the set of frequency resources. In some examples, the control signaling transmitter 1210 may transmit the semi-persistent resource allocation that indicates the semi-persistent resource occasion is configured on each of the set of frequency resources for a defined number of time intervals. In some examples, the control signaling transmitter 1210 may transmit an indication of a set of semi-persistent IDs configured for duplicate data transmission on the set of frequency resources. In some examples, the control signaling transmitter 1210 may transmit downlink control information indicating a configuration for a sounding reference signal and associated with the first frequency resource.

The data transmission transmitter 1215 may transmit, via the semi-persistent resource occasion, a copy of the data transmission on one or more frequency resources of the set of frequency resources. In some examples, the data transmission transmitter 1215 may transmit, via the semi-persistent resource occasion, a copy of the data transmission on one or more frequency resources of the set of frequency resources. In some examples, the data transmission transmitter 1215 may transmit the retransmission of the data transmission based on the grant.

The acknowledgement message receiver 1220 may receive an acknowledgement message via a first frequency resource of the set of frequency resources based on at least one copy of the data transmission being decoded by the UE from the semi-persistent resource occasion on at least one frequency resource of the set of frequency resources.

The negative acknowledgement receiver 1225 may receive a negative acknowledgement message via a first frequency resource of the set of frequency resources based on the UE failing to decode the data transmission from the semi-persistent resource occasion on any of the set of frequency resources.

The reference signal receiver 1230 may receive a reference signal (e.g., a sounding reference signal) via a set of beams using the first frequency resource. In some examples, receiving the sounding reference signal may be based on the indicated configuration transmitted by control signaling transmitter 1210. In some examples, the reference signal receiver 1230 may identify a configuration for the sounding reference signal and associated with the first frequency resource, where receiving the sounding reference signal is based on the identified configuration.

The CC selection component 1235 may select a second frequency resource of the set of frequency resources for transmission of a second data transmission based on measurements of the reference signal received via the set of beams. The grant transmitter 1240 may transmit, via a control channel of the first frequency resource, a grant scheduling a retransmission of the data transmission.

Figure 13:
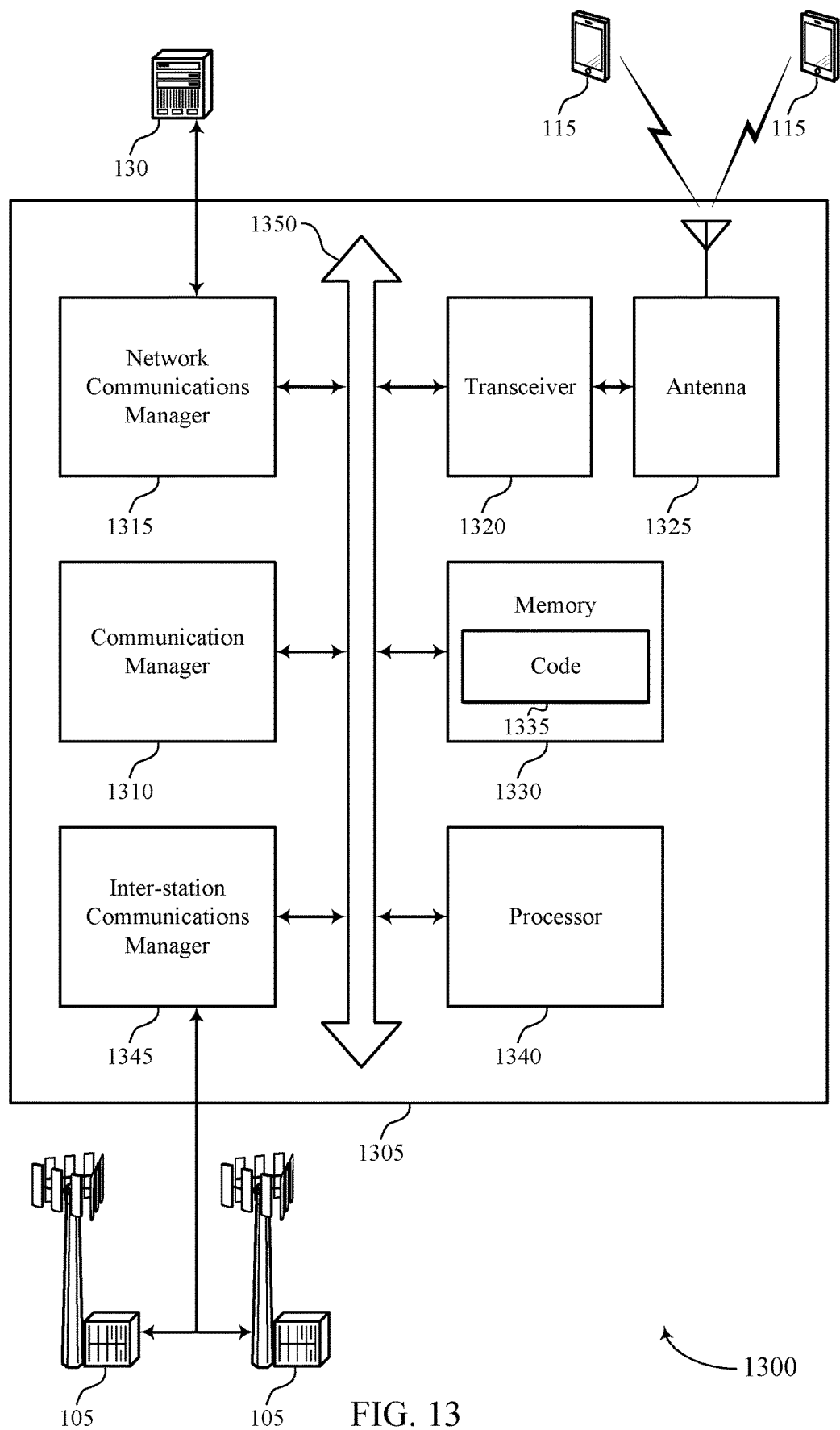
FIG. 13 shows a diagram of a system including a device that supports conditional negative acknowledgement transmission in multi-CC communication in accordance with aspects of the present disclosure.

FIG. 13 shows a diagram of a system 1300 including a device 1305 that supports conditional negative acknowledgement transmission in multi-CC communication in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated, transmit, via the semi-persistent resource occasion, a copy of the data transmission on one or more frequency resources of the set of frequency resources, and receive an acknowledgement message via a first frequency resource of the set of frequency resources based on at least one copy of the data transmission being decoded by the UE from the semi-persistent resource occasion on at least one frequency resource of the set of frequency resources. The communication manager 1310 may also transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated, transmit, via the semi-persistent resource occasion, a copy of the data transmission on one or more frequency resources of the set of frequency resources, and receive a negative acknowledgement message via a first frequency resource of the set of frequency resources based on the UE failing to decode the data transmission from the semi-persistent resource occasion on any of the set of frequency resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting conditional negative acknowledgement transmission in multi-CC communication).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
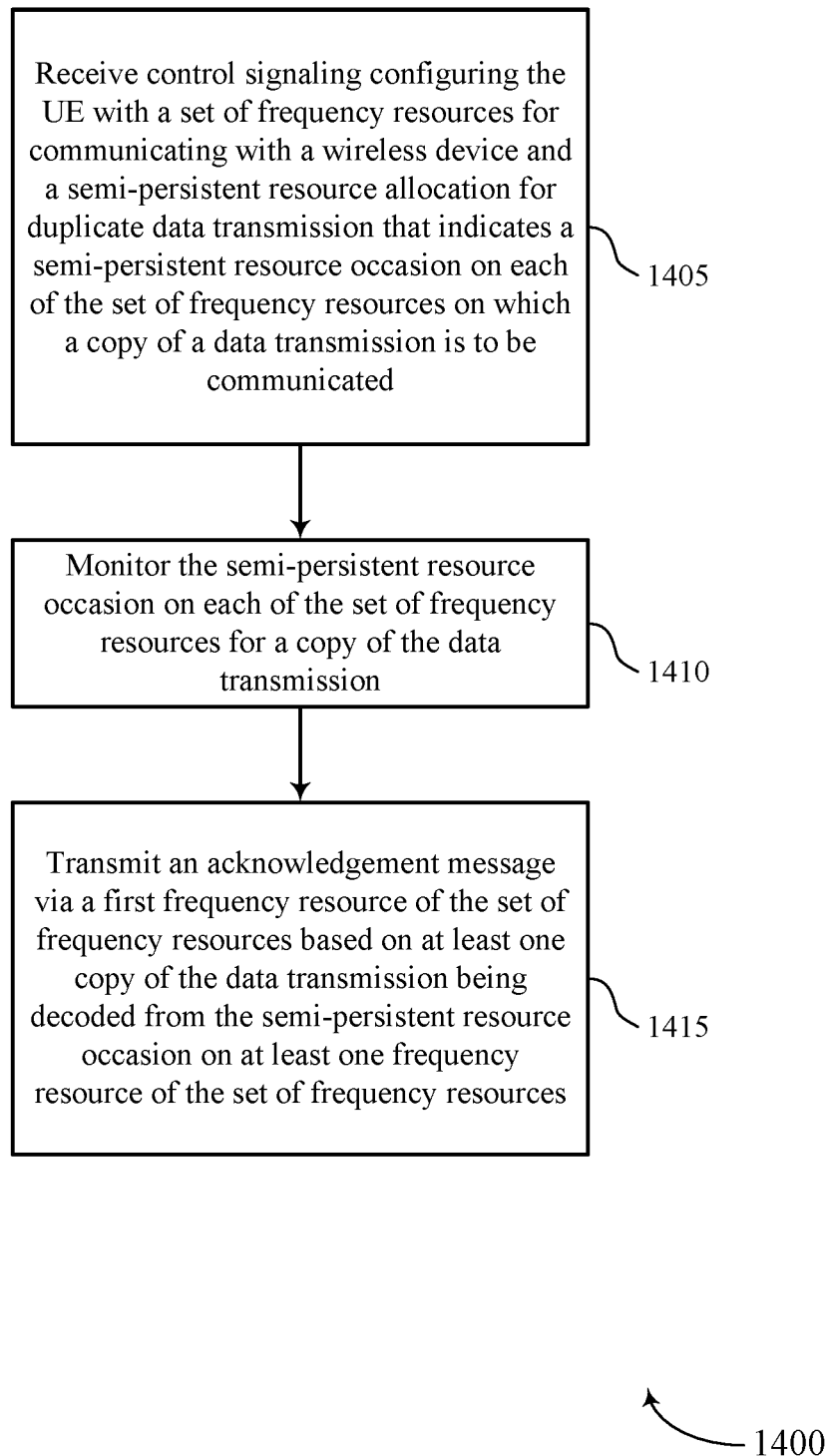
FIGS. 14 through 17 show flowcharts illustrating methods that support conditional negative acknowledgement transmission in multi-CC communication in accordance with aspects of the present disclosure.

FIG. 14 shows a flowchart illustrating a method 1400 that supports conditional negative acknowledgement transmission in multi-CC communication in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may receive control signaling configuring the UE with a set of frequency resources for communicating with a wireless device and a semi-persistent resource allocation for duplicate data transmission that indicates a semi-persistent resource occasion on each of the set of frequency resources on which a copy of a data transmission is to be communicated. The operations of 1405 may be performed according to the methods described herein. In some examples, aspects of the operations of 1405 may be performed by a control signaling receiver as described with reference to FIGS. 6 through 9.

At 1410, the UE may monitor the semi-persistent resource occasion on each of the set of frequency resources for a copy of the data transmission. The operations of 1410 may be performed according to the methods described herein. In some examples, aspects of the operations of 1410 may be performed by a SPS resource occasion monitoring component as described with reference to FIGS. 6 through 9.

At 1415, the UE may transmit an acknowledgement message via a first frequency resource of the set of frequency resources based on at least one copy of the data transmission being decoded from the semi-persistent resource occasion on at least one frequency resource of the set of frequency resources. The operations of 1415 may be performed according to the methods described herein. In some examples, aspects of the operations of 1415 may be performed by an acknowledgement message transmitter as described with reference to FIGS. 6 through 9.

Figure 15:
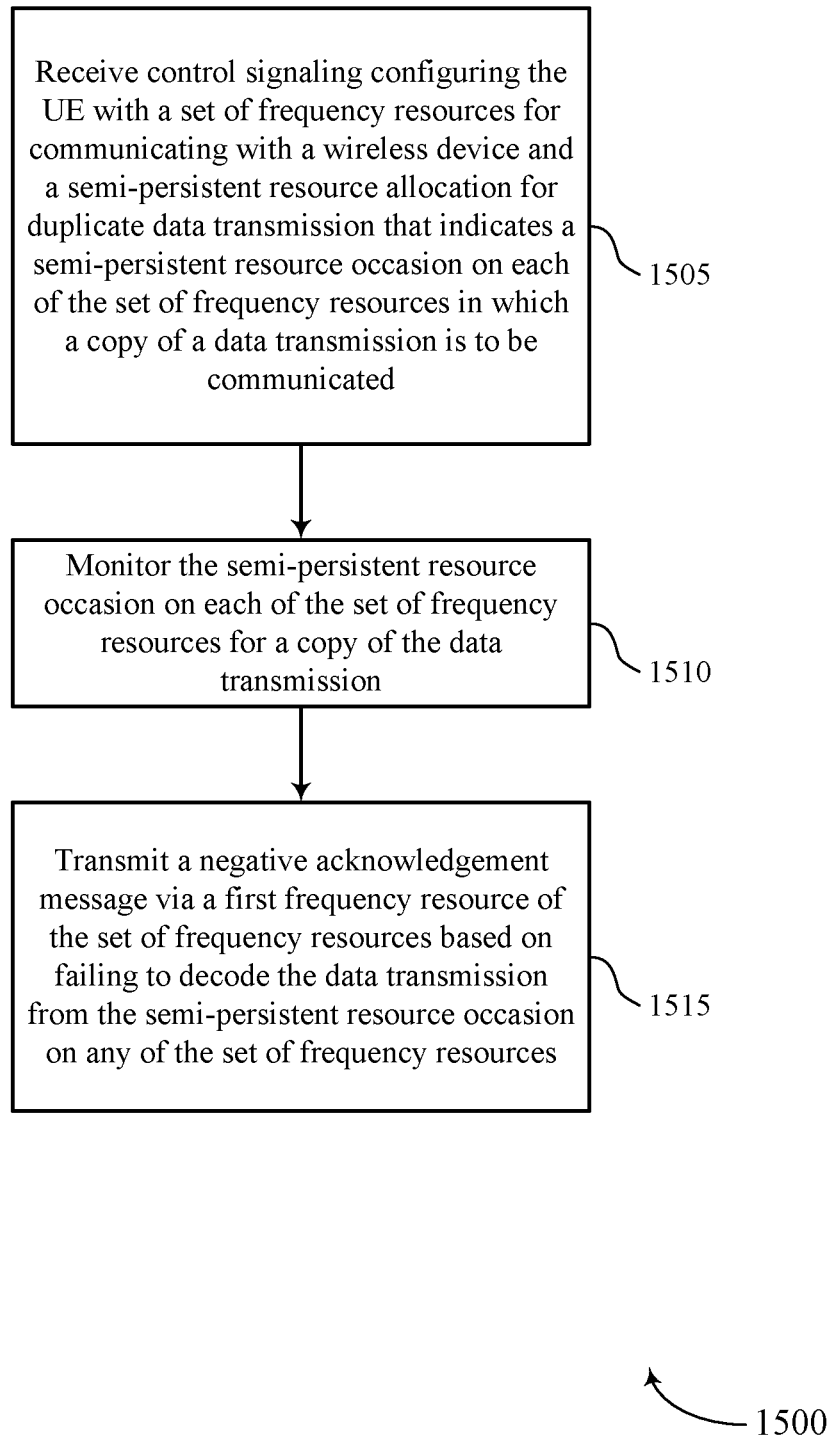

FIG. 15 shows a flowchart illustrating a method 1500 that supports conditional negative acknowledgement transmission in multi-CC communication in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive control signaling configuring the UE with a set of frequency resources for communicating with a wireless device and a semi-persistent resource allocation for duplicate data transmission that indicates a semi-persistent resource occasion on each of the set of frequency resources in which a copy of a data transmission is to be communicated. The operations of 1505 may be performed according to the methods described herein. In some examples, aspects of the operations of 1505 may be performed by a control signaling receiver as described with reference to FIGS. 6 through 9.

At 1510, the UE may monitor the semi-persistent resource occasion on each of the set of frequency resources for a copy of the data transmission. The operations of 1510 may be performed according to the methods described herein. In some examples, aspects of the operations of 1510 may be performed by a SPS resource occasion monitoring component as described with reference to FIGS. 6 through 9.

At 1515, the UE may transmit a negative acknowledgement message via a first frequency resource of the set of frequency resources based on failing to decode the data transmission from the semi-persistent resource occasion on any of the set of frequency resources. The operations of 1515 may be performed according to the methods described herein. In some examples, aspects of the operations of 1515 may be performed by a negative acknowledgement transmitter as described with reference to FIGS. 6 through 9.

Figure 16:
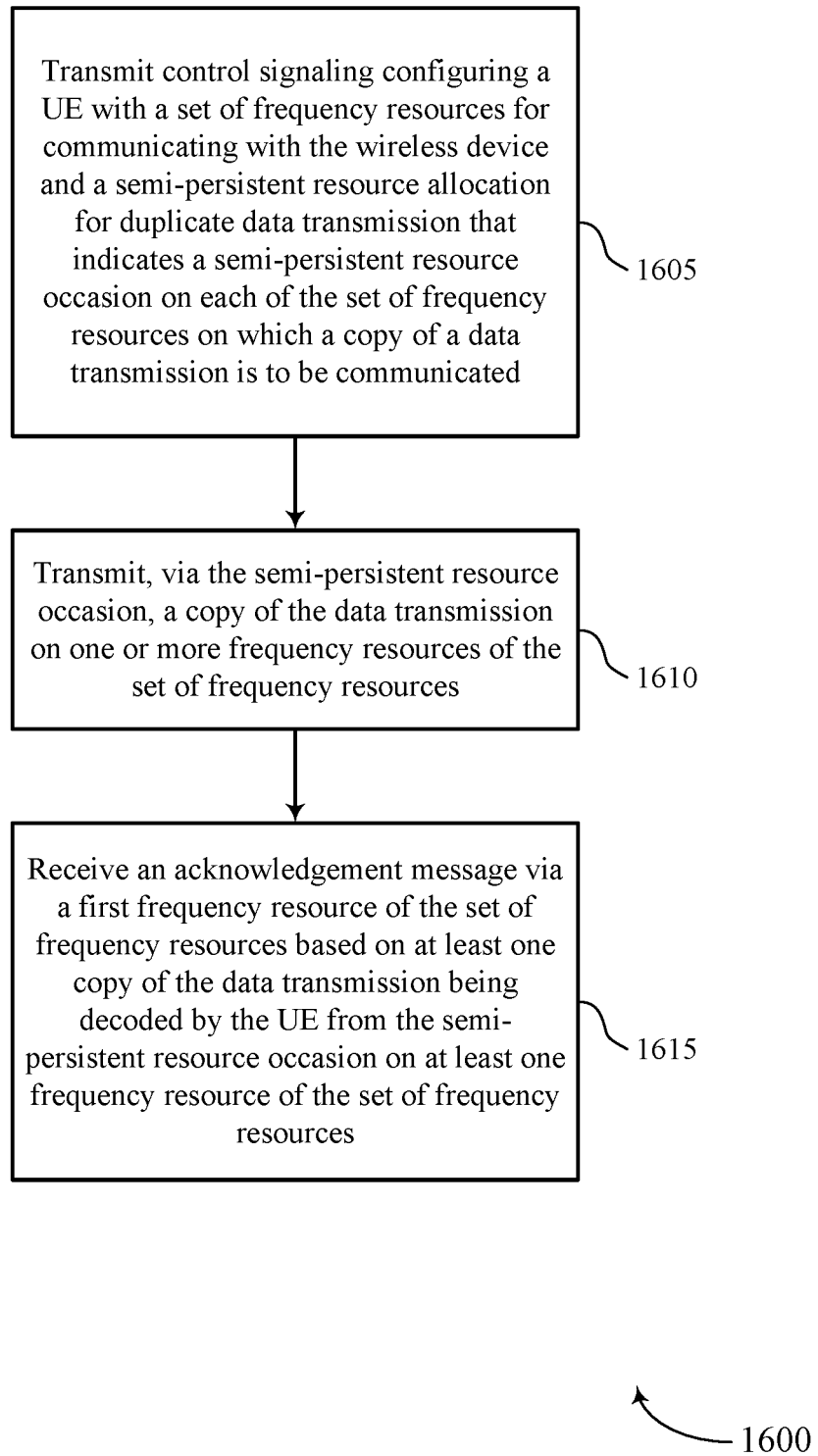

FIG. 16 shows a flowchart illustrating a method 1600 that supports conditional negative acknowledgement transmission in multi-CC communication in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1605, the base station may transmit control signaling configuring a UE with a set of frequency resources for communicating with the wireless device and a semi-persistent resource allocation for duplicate data transmission that indicates a semi-persistent resource occasion on each of the set of frequency resources on which a copy of a data transmission is to be communicated. The operations of 1605 may be performed according to the methods described herein. In some examples, aspects of the operations of 1605 may be performed by a control signaling transmitter as described with reference to FIGS. 10 through 13.

At 1610, the base station may transmit, via the semi-persistent resource occasion, a copy of the data transmission on one or more frequency resources of the set of frequency resources. The operations of 1610 may be performed according to the methods described herein. In some examples, aspects of the operations of 1610 may be performed by a data transmission transmitter as described with reference to FIGS. 10 through 13.

At 1615, the base station may receive an acknowledgement message via a first frequency resource of the set of frequency resources based on at least one copy of the data transmission being decoded by the UE from the semi-persistent resource occasion on at least one frequency resource of the set of frequency resources. The operations of 1615 may be performed according to the methods described herein. In some examples, aspects of the operations of 1615 may be performed by an acknowledgement message receiver as described with reference to FIGS. 10 through 13.

Figure 17:
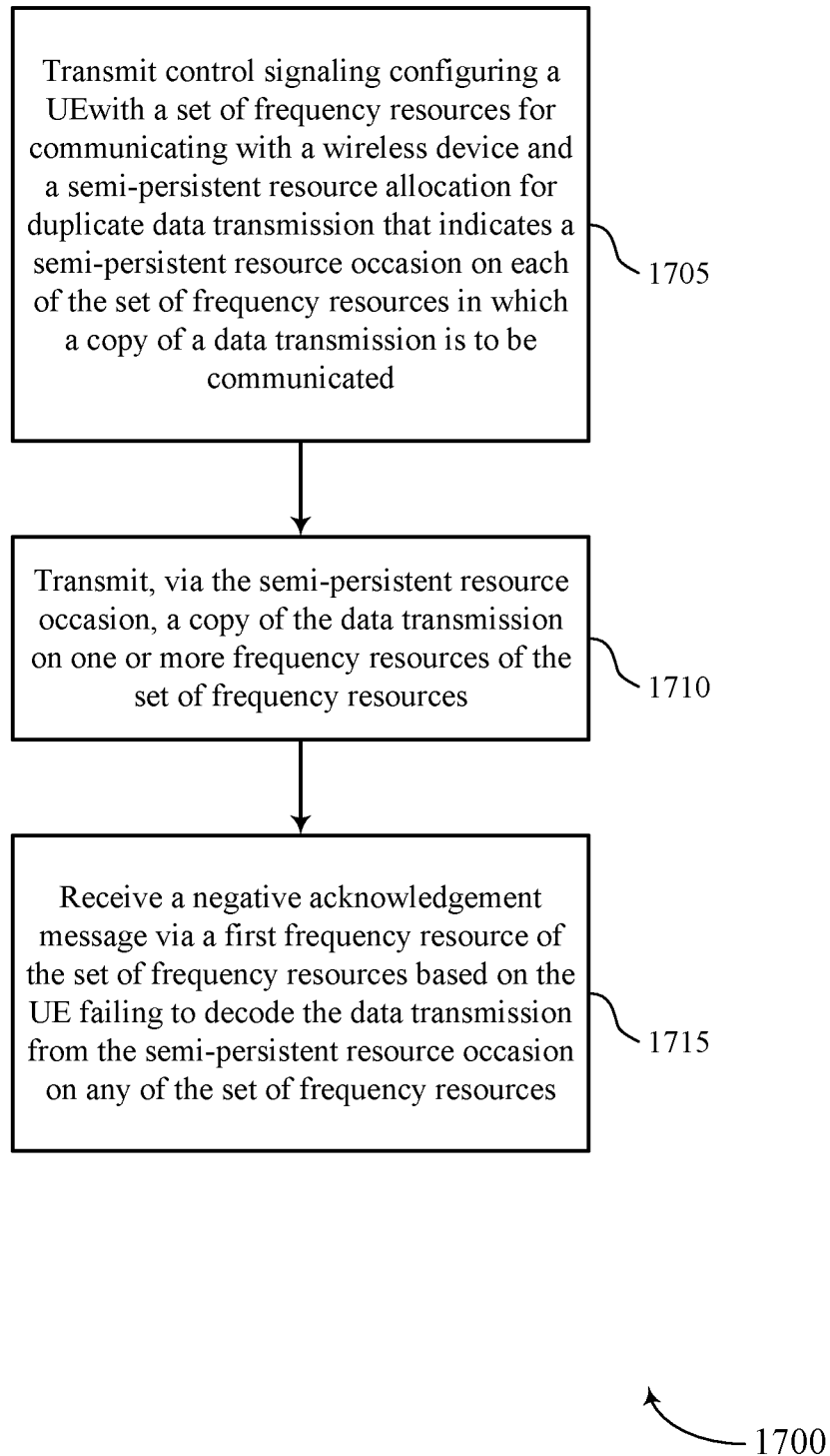

FIG. 17 shows a flowchart illustrating a method 1700 that supports conditional negative acknowledgement transmission in multi-CC communication in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1705, the base station may transmit control signaling configuring a UE with a set of frequency resources for communicating with a wireless device and a semi-persistent resource allocation for duplicate data transmission that indicates a semi-persistent resource occasion on each of the set of frequency resources in which a copy of a data transmission is to be communicated. The operations of 1705 may be performed according to the methods described herein. In some examples, aspects of the operations of 1705 may be performed by a control signaling transmitter as described with reference to FIGS. 10 through 13.

At 1710, the base station may transmit, via the semi-persistent resource occasion, a copy of the data transmission on one or more frequency resources of the set of frequency resources. The operations of 1710 may be performed according to the methods described herein. In some examples, aspects of the operations of 1710 may be performed by a data transmission transmitter as described with reference to FIGS. 10 through 13.

At 1715, the base station may receive a negative acknowledgement message via a first frequency resource of the set of frequency resources based on the UE failing to decode the data transmission from the semi-persistent resource occasion on any of the set of frequency resources. The operations of 1715 may be performed according to the methods described herein. In some examples, aspects of the operations of 1715 may be performed by a negative acknowledgement receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving control signaling configuring the UE with three or more frequency resources for communicating with a wireless device and a semi-persistent resource allocation for duplicate data transmission that indicates a semi-persistent resource occasion on each of the three or more frequency resources on which a copy of a data transmission is to be communicated;
    monitoring the semi-persistent resource occasion on each of the three or more frequency resources for a copy of the data transmission; and
    transmitting a single acknowledgement message via a first frequency resource of the three or more frequency resources based at least in part on at least one copy of the data transmission being decoded from the semi-persistent resource occasion on at least one frequency resource of the three or more frequency resources, a total quantity of the at least one copy of the data transmission being fewer than a total quantity of the three or more frequency resources.

2. The method of claim 1, wherein receiving the control signaling comprises:
    receiving control signaling configuring a feedback scheme at the UE, wherein transmitting the single acknowledgement message via the first frequency resource is based at least in part on the control signaling configuring the feedback scheme.

3. The method of claim 1, wherein receiving the semi-persistent resource allocation comprises:
    receiving the semi-persistent resource allocation that indicates the semi-persistent resource occasion is configured on each of the three or more frequency resources for a defined number of time intervals.

4. The method of claim 1, further comprising:
    determining to skip transmission of a feedback message via a second frequency resource of the three or more frequency resources based at least in part on transmitting the single acknowledgement message via the first frequency resource.

5. The method of claim 4, further comprising:
    receiving the copy of the data transmission via the first frequency resource, one or more other frequency resources of the three or more frequency resources, or both.

6. The method of claim 4, further comprising:
    applying a discontinuous transmission via the second frequency resource during an occasion for transmitting the feedback message.

7. The method of claim 1, further comprising:
    receiving an indication of a set of semi-persistent identifiers configured for duplicate data transmission on the three or more frequency resources.

8. The method of claim 1, wherein the wireless device is a second UE or a base station.

9. The method of claim 1, wherein each of the three or more frequency resources includes a component carrier.

10. A method for wireless communications by a user equipment (UE), comprising:
    receiving control signaling configuring the UE with three or more frequency resources for communicating with a wireless device and a semi-persistent resource allocation for duplicate data transmission that indicates a semi-persistent resource occasion on each of the three or more frequency resources in which a copy of a data transmission is to be communicated;
    monitoring the semi-persistent resource occasion on each of the three or more frequency resources for a copy of the data transmission; and
    transmitting a single negative acknowledgement message via a first frequency resource of the three or more frequency resources based at least in part on failing to decode the data transmission from the semi-persistent resource occasion on any of the three or more frequency resources.

11. The method of claim 10, wherein receiving the control signaling comprises:
    receiving control signaling configuring a feedback scheme at the UE, wherein transmitting the single negative acknowledgement message via the first frequency resource is based at least in part on the control signaling configuring the feedback scheme.

12. The method of claim 10, further comprising:
    transmitting a reference signal via a plurality of beams using the first frequency resource.

13. The method of claim 12, wherein the reference signal is a sounding reference signal.

14. The method of claim 13, further comprising:
identifying a configuration for the sounding reference signal and associated with the first frequency resource, wherein transmitting the sounding reference signal is based at least in part on the identified configuration.

15. The method of claim 13, further comprising:
receiving downlink control information indicating a configuration for the sounding reference signal and associated with the first frequency resource, wherein transmitting the sounding reference signal is based at least in part on the indicated configuration.

16. The method of claim 12, wherein the first frequency resource is within a millimeter wave frequency band.

17. The method of claim 10, further comprising:
receiving, via a control channel of the first frequency resource, a grant scheduling a retransmission of the data transmission; and
monitoring a data channel of the first frequency resource for the retransmission of the data transmission based at least in part on the grant.

18. The method of claim 10, wherein receiving the semi-persistent resource allocation comprises:
receiving the semi-persistent resource allocation that indicates the semi-persistent resource occasion is configured on each of the three or more frequency resources for a defined number of time intervals.

19. The method of claim 10, further comprising:
receiving an indication of a set of semi-persistent identifiers configured for duplicate data transmission on the three or more frequency resources.

20. The method of claim 10, wherein the wireless device is a second UE or a base station.

21. The method of claim 10, wherein each of the three or more frequency resources includes a component carrier.

22. A method for wireless communications by a wireless device, comprising:
transmitting control signaling configuring a user equipment (UE) with three or more frequency resources for communicating with the wireless device and a semi-persistent resource allocation for duplicate data transmission that indicates a semi-persistent resource occasion on each of the three or more frequency resources on which a copy of a data transmission is to be communicated;
transmitting, via the semi-persistent resource occasion, a copy of the data transmission on one or more frequency resources of the three or more frequency resources; and
receiving a single acknowledgement message via a first frequency resource of the three or more frequency resources based at least in part on at least one copy of the data transmission being decoded by the UE from the semi-persistent resource occasion on at least one frequency resource of the three or more frequency resources, a total quantity of the at least one copy of the data transmission being fewer than a total quantity of the plurality of frequency resources.

23. The method of claim 22, wherein transmitting the control signaling comprises:
transmitting control signaling configuring a feedback scheme at the UE, wherein receiving the single acknowledgement message via the first frequency resource is based at least in part on the control signaling configuring the feedback scheme.

24. A method for wireless communications by a wireless device, comprising:
transmitting control signaling configuring a user equipment (UE) with three or more frequency resources for communicating with the wireless device and a semi-persistent resource allocation for duplicate data transmission that indicates a semi-persistent resource occasion on each of the three or more frequency resources in which a copy of a data transmission is to be communicated;
transmitting, via the semi-persistent resource occasion, a copy of the data transmission on one or more frequency resources of the three or more frequency resources; and
receiving a single negative acknowledgement message via a first frequency resource of the three or more frequency resources based at least in part on the UE failing to decode the data transmission from the semi-persistent resource occasion on any of the three or more frequency resources.

25. The method of claim 24, wherein transmitting the control signaling comprises:
transmitting control signaling configuring a feedback scheme at the UE, wherein receiving the single negative acknowledgement message via the first frequency resource is based at least in part on the control signaling configuring the feedback scheme.

26. The method of claim 24, further comprising:
receiving a reference signal via a plurality of beams using the first frequency resource; and
selecting a second frequency resource of the three or more frequency resources for transmission of a second data transmission based at least in part on measurements of the reference signal received via the plurality of beams.

27. The method of claim 26, wherein the reference signal is a sounding reference signal.

28. The method of claim 27, further comprising:
identifying a configuration for the sounding reference signal and associated with the first frequency resource, wherein receiving the sounding reference signal is based at least in part on the identified configuration.

29. The method of claim 27, further comprising:
transmitting downlink control information indicating a configuration for the sounding reference signal and associated with the first frequency resource, wherein receiving the sounding reference signal is based at least in part on the indicated configuration.

30. The method of claim 24, further comprising:
transmitting, via a control channel of the first frequency resource, a grant scheduling a retransmission of the data transmission; and
transmitting the retransmission of the data transmission based at least in part on the grant.

* * * * *